United States Patent
Chapel et al.

(10) Patent No.: US 10,209,727 B2
(45) Date of Patent: Feb. 19, 2019

(54) POWER DISTRIBUTION SYSTEMS AND METHODOLOGY

(71) Applicant: Zonit Structured Solutions, LLC, Boulder, CO (US)

(72) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 412 days.

(21) Appl. No.: 14/680,802

(22) Filed: Apr. 7, 2015

(65) Prior Publication Data

US 2016/0070282 A1 Mar. 10, 2016

Related U.S. Application Data

(63) Continuation of application No. 13/108,824, filed on May 16, 2011, now abandoned, which is a
(Continued)

(51) Int. Cl.
| | |
|---|---|
| *G05F 1/66* | (2006.01) |
| *H04L 12/10* | (2006.01) |
| *G06F 11/30* | (2006.01) |
| *H02J 3/14* | (2006.01) |
| *H04L 12/24* | (2006.01) |
| *G05B 15/02* | (2006.01) |

(Continued)

(52) U.S. Cl.
CPC ............. *G05F 1/66* (2013.01); *G05B 15/02* (2013.01); *G06F 11/3006* (2013.01); *G06F 11/3051* (2013.01); *H01R 25/00* (2013.01); *H02B 1/04* (2013.01); *H02B 1/24* (2013.01); *H02J 3/14* (2013.01); *H04L 12/10* (2013.01); *H04L 41/0833* (2013.01); *Y02B 70/3225* (2013.01); *Y04S 20/222* (2013.01); *Y04S 40/162* (2013.01)

(58) Field of Classification Search
CPC .... G05F 1/66; H02B 1/24; H02B 1/04; H01R 25/00; G05B 15/02; G06F 11/3006; G06F 11/3051; H04L 41/0833; H04L 12/10; H02J 3/14; Y02B 70/3225; Y04S 40/162; Y04S 20/222

See application file for complete search history.

(56) References Cited

U.S. PATENT DOCUMENTS

| | | |
|---|---|---|
| 4,215,276 A | 7/1980 | Janeway |
| 5,486,725 A | 1/1996 | Keizer |

(Continued)

FOREIGN PATENT DOCUMENTS

| | | |
|---|---|---|
| WO | 0967695 | 12/1999 |
| WO | 2007056116 | 5/2007 |

*Primary Examiner* — Kenneth M Lo
*Assistant Examiner* — David J Wynne
(74) *Attorney, Agent, or Firm* — Marsh Fischmann & Breyfogle LLP; Jeremy J. Neilson

(57) ABSTRACT

The invention addresses the needs associated with the entire data center power distribution lifecycle—design, build, operation and upgrades. The design and construction is facilitated by a system for prefabricating power whips that accommodate changing data center needs. The invention also allows for upgrading power supply components without powering down critical equipment. Improved power and network strips and associated logic further facilitate data center operation.

18 Claims, 21 Drawing Sheets

Related U.S. Application Data continuation of application No. 12/891,500, filed on Sep. 27, 2010, now abandoned, which is a continuation-in-part of application No. PCT/US2009/038427, filed on Mar. 26, 2009.

(60) Provisional application No. 61/039,716, filed on Mar. 26, 2008.

(51) Int. Cl.
    *H01R 25/00* (2006.01)
    *H02B 1/04* (2006.01)
    *H02B 1/24* (2006.01)

(56) References Cited

U.S. PATENT DOCUMENTS

| | | |
|---|---|---|
| 5,525,908 A | 6/1996 | Brownell |
| 5,689,242 A * | 11/1997 | Sims ............... G08B 13/1409 340/568.3 |
| 5,917,253 A | 6/1999 | Rusnack |
| 5,926,004 A | 7/1999 | Henze |
| 6,081,205 A | 6/2000 | Williams |
| 6,225,776 B1 | 5/2001 | Chai |
| 6,429,598 B1 | 8/2002 | Haley |
| 6,459,175 B1 | 10/2002 | Potega |
| 6,470,224 B1 * | 10/2002 | Drake .................. B64D 41/00 700/22 |
| 6,487,310 B1 | 11/2002 | Bishop et al. |
| 6,741,442 B1 | 5/2004 | McNally et al. |
| 6,919,816 B2 | 7/2005 | Dearborn et al. |
| 7,123,994 B2 | 10/2006 | Weik et al. |
| 7,188,260 B1 | 3/2007 | Shaffer et al. |
| 7,256,727 B2 | 8/2007 | Fullerton et al. |
| 7,657,763 B2 | 2/2010 | Nelson et al. |
| 7,681,052 B2 | 3/2010 | Darshan et al. |
| 7,936,546 B2 | 5/2011 | Vorenkamp et al. |
| 8,000,074 B2 | 8/2011 | Jones et al. |
| 8,324,838 B2 | 12/2012 | Shan et al. |
| 2002/0024332 A1 | 2/2002 | Gardner |
| 2004/0095237 A1 | 5/2004 | Chen et al. |
| 2004/0264112 A1 | 12/2004 | Koehler et al. |
| 2005/0052185 A1 | 3/2005 | Moore |
| 2005/0068716 A1 | 3/2005 | Pererira |
| 2005/0116836 A1 | 6/2005 | Perry et al. |
| 2006/0125422 A1 | 3/2006 | Costa |
| 2006/0190538 A1 * | 8/2006 | Hwang ............... H04L 12/2809 709/204 |
| 2006/0103504 A1 | 11/2006 | Vassallo |
| 2007/0155349 A1 * | 7/2007 | Nelson ............... H02J 13/0013 455/128 |
| 2007/0168088 A1 * | 7/2007 | Ewing ..................... H02J 3/14 700/295 |
| 2008/0019067 A1 | 1/2008 | Reynolds |
| 2008/0178029 A1 * | 7/2008 | McGrane ............ G06F 1/3287 713/324 |
| 2009/0073957 A1 | 3/2009 | Newland et al. |

* cited by examiner

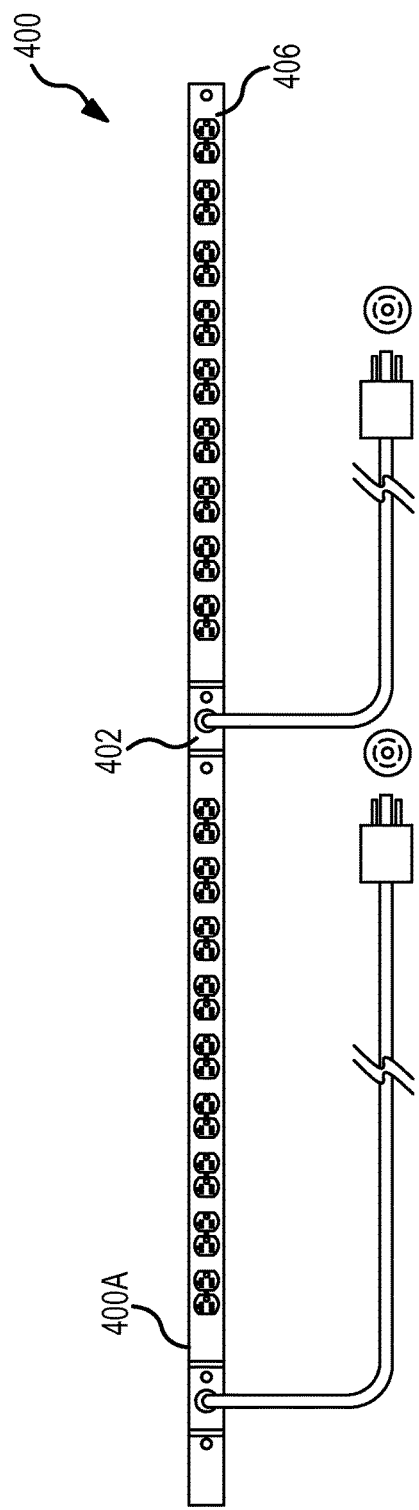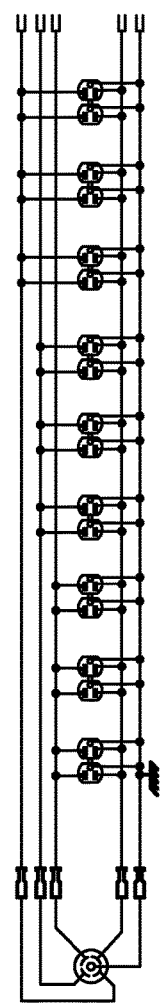
FIG.4A
FIG.4B

POWER DISTRIBUTION SYSTEMS AND METHODOLOGY

CROSS-REFERENCE TO RELATED APPLICATION

This application is a continuation of Ser. No. 13/108,824, entitled, "Power Distribution Systems and Methodology," filed on May 16, 2011, which is a continuation of Ser. No. 12/891,500, entitled, "Power Distribution Methodology," filed on Sep. 27, 2010, which is a continuation-in-part of International Patent Application No. PCT/US2009/038427, entitled, "Power Distribution Systems And Methodology," filed on Mar. 26, 2009, which claims priority from U.S. Provisional Application No. 61/039,716, entitled, "Power Distribution Methodology," filed on Mar. 26, 2008. The contents of all of the above-noted applications are incorporated herein by reference as if set forth in full and priority to these applications is claimed to the full extent allowable under U.S. law and regulations.

FIELD OF INVENTION

The present invention relates to the design and operation of data centers and, in particular, to systems and functionality to supplying power in data center environments.

BACKGROUND OF THE INVENTION

The present invention addresses specific issues that arise in the design, implementation, operation and upgrading of data center environments. Data centers have a specific set of issues that they must face in relation to power supply and management, and the traditional methods in this area were developed from prior industrial electrical practice in a time when a typical data center held very small numbers of mainframe computers and the change rate was low. Now, data centers often contain tens of thousands of electronic data processing (EDP) devices with high rates of change and growth. Data centers are also experiencing rapidly growing power capacity demands driven by CPU power consumption that is currently increasing at a rate of approximately 1.2 annually. The methods developed in the past were not adopted to cope with these change rates, and data centers are therefore having great difficulty in scaling to meet those needs.

SUMMARY OF THE INVENTION

The present invention is directed to systems and methods for addressing needs associated with the entire data center power distribution system lifecycle; design, build, operation and upgrades. It enables professional design practice, consistent and reliable buildouts, high operational change rates with minimum cost and disruption, supports almost all needed power configurations and allows data center power distribution capacity upgrades to be easily accomplished while delivering very high reliability power distribution and meeting the service availability levels demanded of modern 7×24×365 data center environments.

At a high level, the invention enables a superior design process, coupled with an improved materials fabrication and installation method. It also delivers a superior operational environment and provides a pre-engineered turnkey A-B redundant power distribution layer that enables and encapsulates the vast majority of changes needed in power delivery configurations, capacity provisioning, and upgrades to equipment racks during the data center lifecycle. This reduces operational costs enormously and reduces risk compared to the traditional methodology where every power configuration change is made "hot" at the PDU's by adding or removing power whips.

It also greatly reduces the difficulty and costs of upgrading power distribution capacity which in the traditional methodology is both expensive and operationally disruptive. Further, it also enables embedded power/environmental/security monitoring and management capabilities at the rack level, where they can best be used to gather data that can be used to assemble a very detailed and coherent picture of what is really happening in the data center.

The objectives of the present invention include the following:

To allow engineers and architects to design a power distribution system all the way to the rack, by isolating the power type and receptacle dependencies in the rack from the power whips. The power system is uniformly A-B redundant by design with two independent power sources, identified as power sources A and B.

To enable prefabrication of the power branch distribution lines (whips) based on the design plan to allow quicker, cheaper, well documented and more error free installation.

To reduce or eliminate the need to install multiple data communication cabling systems in parallel in the data center, reducing cost and improving cooling airflow. The invention thereby also reduces cabling clutter in the rack for required communication cabling while enabling unique Universal Serial Bus (USB)/Keyboard Video Mouse (KVM) connectivity features.

To reduce or eliminate the need to install multiple network cables for TCP/IP connectivity in the equipment cabinet.

To allow power distribution configuration changes to be made at the rack with little or no changes to the power whips. This greatly lowers cost, minimizes risk, and eliminates the constant need for re-configuration by electricians.

To allow the power receptacle configuration in the rack to be changed with minimum effort and disruption.

To allow the data center manager to select between multiple modes of power distribution in the rack and have a secured level of control of power distribution.

To provide unique in-cabinet User Interface features that make the system much easier to use for data center staff and end users.

To allow data center managers to provision power as desired to one or any arbitrary set of power receptacles to meet customer needs and set policy based reactions to over-limit capacity demands. This can further be used to control power startup timing and sequencing in cold start or power restoration scenarios. It can also be used to control the shutdown of one or any arbitrary set of receptacles in any desired sequence or sets of sequences to accomplish intelligent load shedding in the data center.

To allow power capacity to be upgraded with minimum disturbance to power whips, power distribution components and equipment installed and running in racks.

To enable reporting of a per receptacle power quality with very high accuracy, and allow multiple individual power quality measurements to be integrated into a larger overall report of power quality in the data center for, among other things, isolation and reporting of quality power issues. This capability to "see" the power quality in high detail can also be used to diagnose problems with equipment connected to monitored receptacles because equipment that is starting to fail (particularly in its power supplies) create disturbances in the power waveform that can be recognized and analyzed. This is commonly referred to as "signature analysis."

To allow detailed control and reporting of the power distribution configuration, and power/security/environment status and energy usage in the data center.

These objectives and others are addressed in accordance with the present invention by providing various systems, components, and processes for improving power distribution. Many aspects of the invention, as discussed below, are applicable in a variety of contexts. However, the invention has particular advantages in connection with data center applications. In this regard, the invention provides considerable flexibility in configuring and reconfiguring data center environments. The invention also assists personnel in configuring and servicing data center equipment as may be advantageous, particularly in co-location data centers. The invention also reduces downtime of data center equipment and facilitates remote operation of data center equipment as well as organized powering down and powering up of equipment.

In accordance with one aspect of the present invention, a method and apparatus are provided for distributing power via plug strip modules. The plug strip modules include a number of plug receptacles, a first connector for interconnecting the power strip module to another power strip module, and a power plug port for receiving a detachable power plug for providing power to the power strip module. The modules can be physically interconnected to form a power strip of the desired size. The modules may also be electrically interconnected to function as a single power strip. Alternatively, each module may have its own power cord thus providing significant operational flexibility. The electrical and mechanical connections can be integrated into a single coupling.

In one implementation, a power strip module has a length that is no more than about one-half the height of a data center rack. The power strip module can be mounted to the data center rack in a substantially vertical orientation using the same hardware that is used to mount a full-height power strip. Moreover, two of the modules may be interconnected to form a full-height power strip. The modules may be electrically interconnected to function as a single full-height power strip, or they may each have a separate power cord so as to provide greater power density to the rack. The receptacle type in a single module can also be different in each module to add deployment flexibility so long as total amperage limits of the branch circuit are respected. This allows modules to be connected with different receptacle types to meet power deployment requirements.

In accordance with another aspect of the present invention, an intelligent power distribution system is provided. The system includes: a monitoring device for monitoring a power signal delivered to one or more electrical devices via a set of one or more receptacles; a controller for performing a comparison of monitored values to reference values defined by a policy; and a switch system for selectively interrupting the delivery of power to one or more receptacles of the set of receptacles based on the comparison. For example, the intelligent power distribution system may function as a set of intelligent circuit breakers. In this regard, the loading of each receptacle, or each subset of receptacles, may be monitored in relation to a power distribution policy. When a policy violation is identified, power may be interrupted to the monitored receptacle or subset of receptacles. In this manner, the circuit breaker functionality can be implemented intelligently and with respect to specific devices associated with specific receptacles. In addition, the inventive system allows electrical devices to be turned on or turned off in a defined sequence as may be desired particularly in a data center context.

In accordance with a still further aspect of the present invention, an apparatus and associated methodology are provided for allowing manual configuration of a plug strip or outlet (collectively, "receptacle device"). The system includes a receptacle device having one or more plug receptacles and a controller having a first configuration for monitoring power delivery via the receptacle device and a second configuration for monitoring and controlling power delivery via the receptacle device. For example, in the second configuration, logic may be enabled for remotely controlling one or more of the plug receptacles, for example, to enable or interrupt power delivery via the receptacle. It will be appreciated that some operators may choose to disable such remote operation, at least for certain equipment or at certain times. This may be desired for security purposes.

Accordingly, in one implementation, the controller may be manually operable to select either the first configuration or the second configuration. For example, a key may be required to switch a plug strip between the first and second configurations. In one implementation, more than two configurations may be supported in this regard. For example, a four configuration implementation may include the following configurations: 1) monitored and switched—all receptacles can be remotely turned on or off, 2) monitored only—the last set receptacle on/off configuration remains active, but no changes can be made 3) monitored only—all receptacles on, and 4) all receptacles powered off. In this manner, significant flexibility is provided in allowing intelligent remote operation or conventional operation.

In accordance with another aspect of the present invention, light signaling is provided in connection with a receptacle device. An associated apparatus includes a receptacle device having one or more plug receptacles, at least one optical device (e.g., an LED) associated with at least one plug receptacle of the receptacle device, and logic for operating the optical device. For example, an operator may thereby control the optical device, e.g., via a LAN or WAN, to activate the optical device. This may be done for a variety of reasons such as to light the vicinity of the receptacle device, identify the receptacle device where servicing is required, to signal state information or display signaling to identify a power source, phase, etc. The optical devices in a plug strip with a number of receptacles can also be used as a group or sub-groups to indicate other information such as plugstrip or equipment cabinet state, location, etc. It will be appreciated that this may be particularly advantageous in co-location data center environments where servicing personnel may be unsophisticated or unfamiliar with the data center configuration.

In accordance with a still further aspect of the present invention, a method is provided for facilitating reconfiguration of a power distribution environment. An associated method involves redundantly connecting an electrical device to a first receptacle device associated with an A power source and a second receptacle device associated with a B power source, configuring the receptacle devices so that the A and B power sources are provided by separate first and second power supply units, disconnecting the electrical device from the first power supply unit and upgrading one of the first power supply unit and the first receptacle device. In one implementation, electrical devices are associated with multiple power supplies, and each of the power supplies include multiple power sources. Appropriate switches are provided for automatically switching between power sources in the event that a primary power source is interrupted. In this manner, the power distribution environment can be reconfigured without concern regarding interrupting power to critical equipment.

In accordance with another aspect of the present invention, a side access system is provided for use in distributing power to data center equipment. The system is used in connection with an enclosure having a number of vertically distributed shelves, each shelf having a front with a first side-to-side dimension and a side with a second front-to-back dimension, where the second dimension is greater than the first dimension. As noted above, the enclosure may be, for example, an enclosure or rack. The system includes a power strip having a number of electrical outlets spatially distributed along a longitudinal axis and support structure for supporting the power strip on the enclosure such that the longitudinal axis extends along a side of one of the shelves. For example, the power strip may be aligned with a front-to-back axis of the enclosure or may be disposed at an angle relative to the front-to-back axis, preferably any such angle is less than approximately 30 degrees. The power strip may be disposed adjacent a side edge of the enclosure or some space may be provided therebetween. For example, as discussed above, some enclosures include some additional space at the sides for running power cords or for enhancing equipment access/ventilation. In connection with such enclosures, the power strip of the present invention may be spaced from a side edge of the enclosure, for example, by up to about 6 inches. Such spacing would allow the plugs and power cords to be retained within the enclosure as may be desired.

Optionally, more than one power strip may be used in connection with a given shelf of an enclosure. For example, power strips may be provided along both side edges of a shelf. In addition, where the enclosure geometry allows, a power strip may include more than one row of outlets or power strips may be vertically stacked along a side of the shelf. The power strip may also facilitate access to separate power sources, which may be desired, as discussed above, for certain mission critical systems. In this regard, outlets associated with different power sources may be integrated into the power strip or one or more power strips may be used in conjunction with a power distribution unit associated with multiple power sources. For example, a power strip disposed along one side edge of a shelf may be plugged into a first power source of a power distribution unit, and a second power strip disposed along the opposite side of the shelf may be plugged into a second source of the power distribution unit. In this manner, convenient access to redundant power sources can be provided for any equipment in the enclosure or adjacent enclosures. In one implementation, a compact power switching unit, operative to switch between first and second power sources, may extend between first and second power strips (each of which is associated with a separate power source), for example, along a back edge of an enclosure. It will be appreciated that the side access power strips provide easy access, increase the number of outlets that are available and improve routing of power cords and ventilation.

In accordance with another aspect of the present invention, a method for using a side access power strip is provided. The method involves providing a power strip with a number of outlets, disposing the power strip on an enclosure such that a longitudinal axis of the power strip extends along the side of one of the shelves, and accessing the power strip via a side of one of the shelves so as to plug a power center equipment device into one of the electrical outlets. As discussed above, the power strip can be immediately adjacent to an edge of the enclosure or spaced at a distance therefrom. In addition, the power strip can be aligned with the front-back access of the enclosure or offset at an angle in relation thereto.

The present invention thus provides a number of advantages in connection with the design, implementation, operation, and upgrading of data center environments. In particular, data centers can be laid out efficiently and in a manner that reduces the need for reconfigurations and allows such reconfigurations to be accomplished efficiently, when necessary, and with little or no down time. In addition, any changes to data center environments can be effectively and accurately executed even by relatively unskilled personnel. Moreover, power is reliably delivered to critical equipment via redundant power sources. Data centers can also be monitored more effectively to identify potential problems or to execute user policies regarding power usage or sequencing for powering up and powering down. The invention thus provides improved operational effectiveness and efficiencies throughout the lifecycle of a data center.

BRIEF DESCRIPTION OF DRAWINGS

For a more complete understanding of the present invention and further advantages thereof, reference is now made to the following detailed description taken in conjunction with the drawings in which:

FIGS. 4A-4F show a double-shot power strip in accordance with the present invention;

DETAILED DESCRIPTION

In the following description, the invention is set forth with respect to various systems, components and processes for use in a data center environment. It will be appreciated that various aspects of the invention are applicable in other contexts. Accordingly, the specific structure and functionality set forth below should be understood as exemplifying the invention and not by way of limitation. Moreover, for convenience of reference, various systems, components, and methodology are identified by the Zonit trademark. The Zonit trademark is owned by Zonit Structured Solutions, LLC, the assignee of the present application.

I. Introduction

The Zonit Power Distribution System includes certain methodology as described in detail below and apparatus to instantiate or execute the methodology. In one embodiment, the system includes (these items are shown and described in more detail below):

1. Zonit Specification Power Whips

These are prefabricated power whip cables that are keyed to the Zonit design and installation methodology. These whips have several advantages over traditional electrical installation methods. They also can be specified in a way such that power capacity upgrades can be done later with minimal changes.

2. Zonit Power Management Station

Zonit's management architecture is designed to meet current and future data center management needs. These are in the areas of power monitoring, control and environmental and security monitoring.

Figure 1:
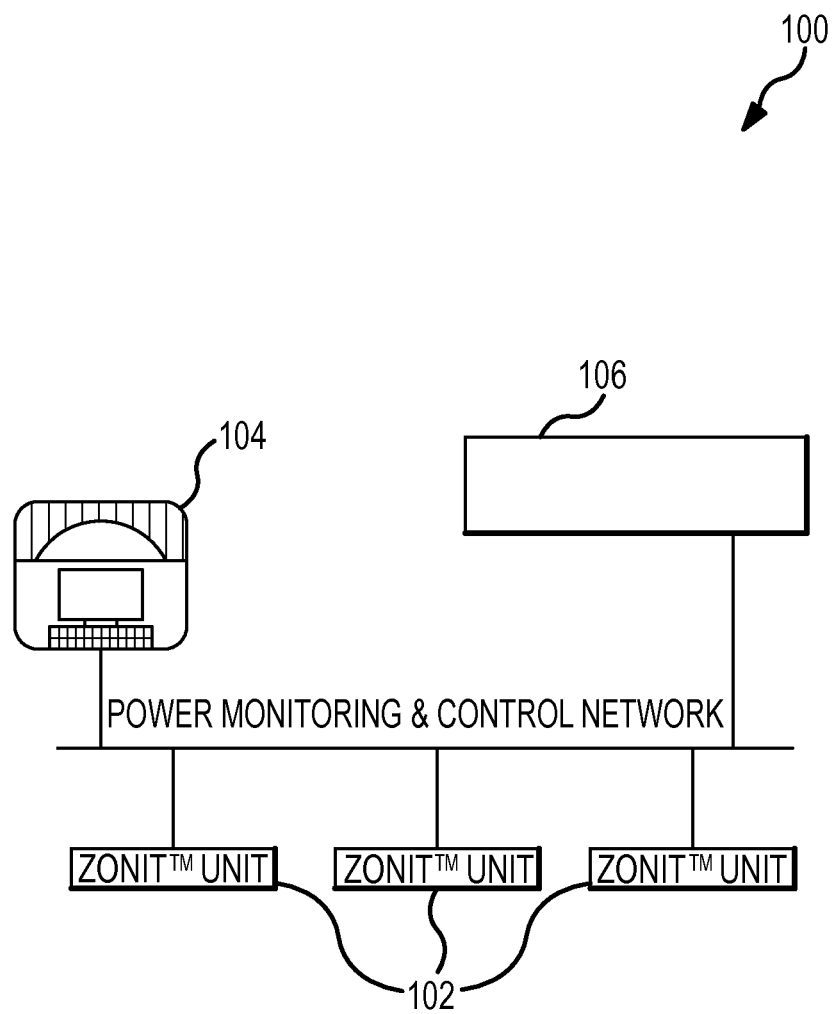
FIG. 1 is a schematic diagram of a power management system in accordance with the present invention.

The management architecture 100 may be implemented as a distributed two tier design as shown in FIG. 1. In the illustrated embodiment, individual Zonit Power Distribution Units (ZPDUs) 102 each have an optional embedded control module. This module is a field replaceable unit (FRU) that is field upgradable/replaceable. The module has an embedded hardened Linux (or other suitable operating system) instance that offers easy implementation of current and future network management capabilities. The central management appliance 104 (which can be replicated for availability) communicates with each ZPDU 102 and collects data and offers a central dashboard, policy setting, and control point. All functions can be accessed via a Secure Socket Layer (SSL) secured Web Interface. The access security can be further raised via integration with 2 or multi-factor authentication systems.

A unique feature in the Zonit management architecture 10 is the design of the control and communication mechanism. Each ZPDU uses Z-Protocol, a Zonit defined protocol to communicate with Zonit intelligent adapters, plug strips and receptacles as described below. This enhances security, by using a proprietary protocol. However other proprietary or secure public protocols could be used for this purpose. Each ZPDU 102 communicates with the Zonit Power Management Station 106 via TCP/IP. However, how that communication channel is designed offers two types of functionality. The ZPDU 102 can act as an intelligent intermediary processing node that packages and presents information, status alerts and other data to the Zonit Power Management Station 106. This is appropriate for command and control functions that need or can benefit from quick feedback control or other local supervision.

A second mode of interaction is where each ZPDU 102 acts as a TCP/IP gateway to the set of controlled power monitoring points, ZPDU outlets and attached Zonit G2 intelligent adapters, plug strips and receptacles. In this mode, the ZPDU 102 is a pure communications channel, taking TCP/IP addresses and commands (which may use subsidiary TCP/IP protocols such as Simple Network Management Protocol (SNMP) and/or TCP/IP based Zonit proprietary daemon processes running on Zonit defined ports) and translating them into Z-Protocol (or other proprietary or secure public protocol) addresses and command codes and returning the resulting data and status codes. The TCP/IP communication method can be made secure by using encrypted TCP/IP links between each ZPDU 102 and the Zonit Power Management Station 106.

This mode of operation is best suited for command and control functions where a central process running on the Zonit Power Management Station 106 accesses and uses the set of Zonit ZPDU functions and ZPDU connected endpoints to do global functions that span the entire set (or a selected subset) of deployed ZPDUs 102. This unique data center power distribution architecture for command and control allows a wide range of functionality to be delivered.

The Zonit Power Management Station 106 enables integration to enterprise network management systems. It allows setting of both global and local alerting and notification parameters. A key design goal is to minimize or remove the complexity of setting alert/notification policies and integration with enterprise management systems as used in Network Operation Centers (NOC). The Zonit management architecture 100 is designed to meet current and future data center management needs in the areas of power monitoring, control and environmental and security monitoring.

3. Zonit ZPDU (Zonit Power Distribution Unit)

These are rack-distributed power distribution units that implement the Zonit methodology and incorporate other Zonit technologies. The ZPDU 102 is a device that takes A-B power source input feeds from the power whips and distributes that power through plug strips and adapters that have the required power capacity and receptacle types. The ZPDU balances loads on each phase using Zonit patented phase rotation technology (U.S. Pat. No. 6,628,009, which is incorporated herein by reference).

Figure 2:
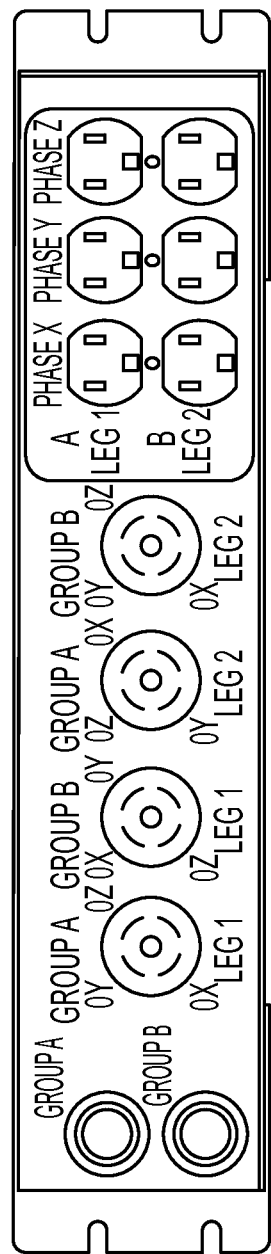
FIG. 2 is a back view of a power distribution unit that can be used in the system of FIG. 1.

FIG. 2 is a back view of a ZPDU showing receptacles associated with the different phases and sources. All the main power connections of the ZPDU use a set of foolproof twistlock NEMA connectors. The power is therefore redundant (the A-B sources are independent and separate) and able to be adapted to any needed power type in 20 A (three-phase, split-phase or single phase) and delivered in any needed receptacle type via the Zonit plug strips or plug adapters. Other amperages than 20 A are possible, but 20 A is the most common amperage limit that most EDP equipment use. The Zonit Generation Two (G2) ZPDU will incorporate embedded hardware that will allow it to perform command, control, management and reporting of power capacity, power distribution configuration, power/security/environment status, energy usage and power quality in the data center, all as described in more detail below.

4. Zonit ZPDU Modular Input Method

This is a modular input method for the G2 ZPDU that allows it to accept a range of power capacity inputs, for example, A-B 30 A to 60 A three phase inputs), combined with an internal power distribution design that can be used with the desired range of input power capacities. This gives the data center manager the ability to upgrade the power capacity in place, without changing anything in the power distribution system at the rack level other than the power inputs to the ZPDU.

5. Zonit Generation Two Powerstrips

These are plug strips that implement power monitoring and switching functionality using Zonit technologies. They are designed to be used with the Zonit ZPDU. They a have unique security control mechanism. Additionally, they incorporate unique LED user interface functionality which is used both individually and in groups or combined with LED's on the ZPDU. They also have a method of detecting power cords that are plugged into receptacles but that are not currently drawing power.

6. Zonit "Double-Shot" Generation Two Powerstrips

These are Zonit Generation Two powerstrips that implement a unique single or double density power distribution and mounting method. They share all of the other features of Zonit Generation Two plug strips.

7. Zonit Plug Adaptors & Phase Rotators

These are Zonit specified plug adapters that work with the Zonit methodology to deliver power to devices in the 20-60 A range in three-phase, split-phase, and single phase configurations. The plug adapters either plug directly into a power whip or plug into the Zonit ZPDU. The phase rotator implements phase load balancing as described in U.S. Pat. No. 6,628,009, which is incorporated herein by reference. The phase rotator can be a separate in-line adapter or incorporated into a Zonit plug adapter.

8. Zonit USB/KVM Distribution Strips

The Zonit USB/KVM distribution strip 320 in conjunction with the Zoned Power Distribution Unit—Generation Two (ZPDU-G2) (or modular appliance) Protocol Gateway functionality was designed to meet the needs of the modern center by greatly reducing or eliminating the need to run parallel data communication cabling systems for USB or KVM functionality. It does so by providing two key types of connectivity that are needed in the equipment cabinet, USB and KVM. Note: Combined network, USB and KVM connectivity is available by using the NetZonit system as described in PCT Application Number PCT/US08/57154 which is incorporated herein by reference. That system does not require a ZPDU-G2 (or modular appliance) to perform the Protocol Gateway function, it is integrated into the NetZonit unit. The USB/KVM Distribution Strips are Zonit designed vertical distribution strips that incorporate one or more USB ports for each 1 U (1.75 inches vertical) of rack space in a cabinet and a matching set of dedicated KVM ports for each 1 U. They can be mounted independently or in conjunction with Zonit vertical plug strips, which can have optional mounting brackets to allow the USB/KVM distribution strips to attach to the sides of the Zonit plug strips. The USB/KVM distribution strips each connect to a Zonit ZPDU-G2 unit (or optional modular appliance that does the same job) and use that unit to connect to a data network. The ZPDU-G2 optionally contains hardware and software that is used to perform a protocol gateway function as described in PCT Application Number PCT/US08/57154, which is incorporated herein by reference. This allows each USB port to be put on a "Virtual USB Bus" as described in that patent filing. The KVM ports are connected to the ZPDU-G2 via a special connector and communicate with it via that mechanism. The KVM functionality is as also described in the PCT Application Number PCT/US08/57154 with the Zonit ZPDU-G2 optionally containing hardware and software to performing the roles of KVM and network switch logic.

Figure 3A:
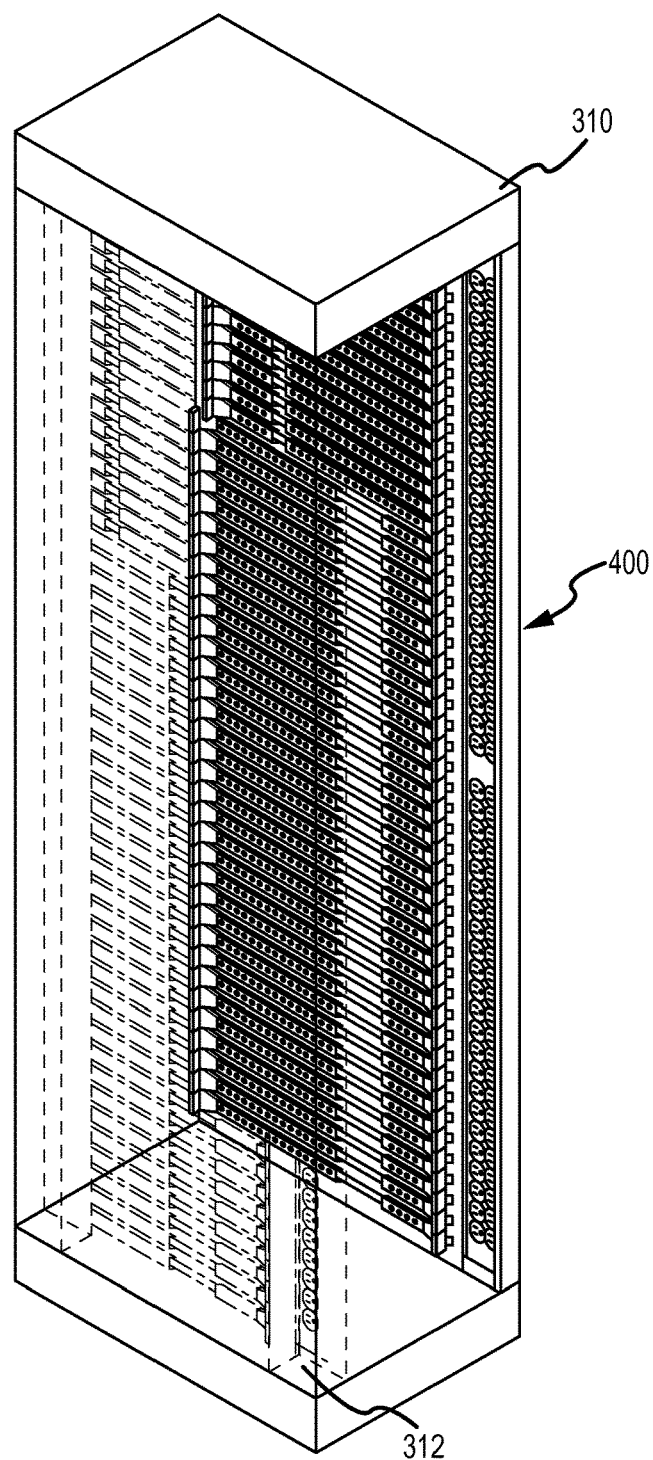
FIGS. 3A-3C show a network power strip and network port strip for assembly in a rack system of a data center in accordance with the present invention.

It is noted that the illustrated equipment mounting system facilitates positioning of power and network strips in a corner of the rack as shown in FIG. 3A. This mounting system is described in detail in U.S. Provisional Patent Application Ser. No. 61/040,924 which is incorporated herein by reference. In that system, the rail and slider assembly can be mounted on vertical rails on the sides of the rack which provides significant flexibility to configure the rack corners for receiving power and network strips.

II. Data Center Issues

Data centers represent large investments, especially in their core power and cooling infrastructure. Cooling towers, generators, UPS units, transfer switches, raised floor, fire suppression systems and physical security systems are all expensive investments. As a result, data centers have long life cycles and need to be designed to maximize the return on their large capital costs. The highest area of infrastructure change in data center environments is in power distribution to the racks. This is because power must be delivered to every device and the type and kind of power needed for a particular device being installed or moved into a specific rack can and does frequently dictate a change in the power distribution system configuration.

A. Data Center Power Distribution Design and Build-out Issues

Architects and industrial engineers design the core infrastructure systems of data centers, but in traditional practice do not extend the reach of the design to the floor layout, beyond identifying where the rows of equipment cabinets or racks may be located. This is because the data center manager has control over what equipment will be located in which rack(s) and therefore, the architect and engineers do not attempt to specify this part of the data center. The data center manager generally engages and directs electricians by telling them what type and kind of power receptacles are required for each equipment rack. The electricians install them following the National Electrical Code (NEC). This is the traditional electrical contracting approach. It works well in low-change environments, but is labor intensive and dependent on the expertise and experience of the data center manager and the electricians. In a highly dense electrical environment such as a data center, the results achieved are often more expensive and less than optimum. When high operational change rates are added in, most data centers experience a decline in power distribution organization over time and the costs of making configuration changes remain constant or increase.

The Zonit Power Distribution System addresses the shortcomings of the traditional approach by using a methodology that is repeatable, delivers the same quality every time, reduces material and installation costs and provides a superior operational environment with greatly reduced risks and costs. It also allows the design architects and engineers to extend their design efforts using the Zonit methodology to the data center floor. This delivers a professional, repeatable result, vs. the variable quality of the legacy trade practices used by the traditional methodology. It does so in the following ways:

1. Power Distribution Design Issues

The Zonit system separates the design issues of capacity vs. power and receptacle type and isolates their dependencies. This allows the design process to be simplified yet insure the desired results. The whip grid configuration can be specified without worrying about the exact power or receptacle type in the rack. Instead the design process can be focused on matching the whip capacity and location to the desired rack power density throughout the data center.

2. Conduit/Raceway Issues

The NEC dictates how conduits and raceways can be installed and used. There are 3 basic ways that power typically is distributed in the data center;

Conduits—These are rigid or flexible metal pipes that have wires ("conductors" in NEC parlance) pulled through them. At one end they are terminated in a Power Distribution Unit (PDU), at the other in an electrical power receptacle. The assembly is called a power branch or whip.

Raceways—These are metal enclosures that can be optionally sub-divided internally and functions as a conduit. These are operable conduits, i.e., the conduit can be opened up along its axis to allow removal and insertion of conductors. They come in a variety of sizes.

Busbar (also called Busway, for example Starline & others) Systems—These are solid metal bars "buses" that connected together to form a power distribution conductor and are used to power circuit breakers near the racks, routed inside of an insulating case. They are expensive and if they fail (usually at their connection joints), can do so quite dangerously, since they carry very high power current. They also have the issue that if they fail, all of the racks powered from them go dark, so they represent a single point of failure with multiple dependencies downstream. In addition, busway systems utilize significantly more copper than traditional wiring methods. Because a busway system must be able to carry the full rated current at any point along its length, the entire buss must be sized at the rated current. Generally speaking, nearly ½ of the copper utilized in a busbar or busway system is excess. This excess is both wasteful of resources and expensive.

One of the key issues in conduit and raceway systems is how many conductors can be routed through a conduit or raceway. NEC codes are designed to insure that the heat given off by the conductors in a conduit or raceway cannot reach dangerous levels. In a data center where power distribution levels can reach over 15 kW per rack (or over 40 kW per rack with per rack cooling systems), the problem of how to get so many conductors to each rack becomes difficult.

In the traditional approach, conduits or raceways are often used. The NEC code dictates that each conduit (or sub-divided raceway, which is considered a conduit) can only have a certain number of conductors before requiring "de-rating" which effectively means the data center operator must lower the amount of current going through the conductor or alternatively, use larger gauge conductors for the desired current capacity. The effect of this is that a great number of conduits must be provided, which is expensive and can consume valuable raised floor plenum space which impedes cooling airflow. The NEC codes allows conductors as follows:

Per conduit
1. Up to 4 conductors (ground excluded) at 100% capacity
2. Up to 9 conductors (ground excluded) at 80% capacity
3. Up to 30 conductors maximum in any one wireway The following example will make clear how in a high power density data center this becomes a difficult design issue. Consider a data center of 14,000 square feet designed to contain 314 racks. An optimized layout could have 3 main raceways with PDU's located along those raceways to minimize the length of the conductors run in conduit for the average power whip. In one configuration, each of 14 branch raceways may have about 20 racks on average. To achieve an average power density of 10.3 kW per rack requires one 30 A 208V three phase power whip per every other rack or equivalent. To make the system A-B redundant (fed independently from both an A and B power source) the number of power whips is doubled for the B source. The row of 20 racks will therefore require 20 receptacles, each containing 5 conductors (3 hot, 1 neutral, 1 ground), for a total of 100 conductors. A #8 gauge conductor is required for 30 A current in this example with the applicable NEC de-rating. A #8 gauge wire is thick, with a nominal diameter of 0.22 of an inch and heavy, weighing 1 lb. for each 10 feet. To route 100 conductors without de-rating would take 25¾" conduits or a raceway 36" wide. Standard raised floor is built on a 2'×2' grid with the supports on that modulus, so a raceway that wide does not fit.

Clearly, what is happening is that the standard approach does not scale up well to these power densities. It was not designed to supply this level of power in this small of a space.

The Zonit methodology addresses this issue and lowers installation costs by allowing for the use of prefabricated redundant A-B power whips in a limited number of configurations as follows; All Zonit ZPDU-G2 units are designed to be fed by two A-B 30, 40, 50 or 60 A 208V three phase wye configured power whips with oversized (+1 gauge) neutral conductors. Other voltage/amperage combinations are possible, but at present these best match the required range of power capacities. The Zonit power whips can be pre-fabricated by using appropriately sized metal-clad "MC" cables with current carrying capacity of 30 A or 60 A and an oversized neutral. The length of each cable can be determined, as will be described in more detail below, from examination of a plan view of the data center with the rack layout indicated. AutoCAD® design templates, developed by Zonit Structured Solutions, LLC, facilitate this process. The designer lays out the power whip paths and specifies their capacity and type and the template calculates a bill of materials for that layout. The completed template is sent as part of the order process to Zonit Structured Solutions, LLC and the bill of materials is confirmed. The power whip lengths are computed from the site plan drawing(s). The metal-clad cables can then be pre-cut to length, labeled properly, terminated and shipped to the data center. This has several benefits;

1. Labor costs are greatly reduced because it is very time intensive for electricians to bend and install hard conduit and/or pull conductors through flexible conduits. The Zonit methodology reduces these labor costs. Also, prefabrication at a site designed for this purpose and operated in an assembly line type environment is intrinsically more efficient. The quality control can be maintained at a higher level, and pre-testing prior to leaving the factory facilitates Code compliance and final quality control.

2. The use of pre-cut MC cable insures that the ends can be properly prepared for installation and carefully labeled and coded to an installation design drawing. The metal-cladding is flexible thus easing installation routing and insuring that no EMI issues occur. It also can be specified with an internal and/or external moisture seal, for environments that need or want this feature and is more water resistant than hard conduit, since it only has one installation "joint", where it enters the outlet receptacle box. For our example, a space of 12×24" matching the 2'×2' floor grid can hold 171 MC cables each of 5 conductor 60 A capacity.

3. Pre-labeling helps insure correct installation both at the PDU and receptacle.
4. The Zonit system is designed to use a modular grid of power whips that are deployed simultaneously at one point in time, preferably at the initial build-out of the data center. The power whips can be any input amperage in the range that the Zonit ZPDU will accept. In one implementation, 30 to 60 A three phase wye configured branch (whip) circuits are used. The choice of what amperage to deploy (30 A to 60 A) of power whip wiring is straightforward and it can be done via various algorithms, including algorithms engineered by Zonit Structured Solutions, LLC. This will allow the design engineer to determine what the maximum cooling capacity of the data center will be and deploy a grid of Zonit specification power whips to match the power distribution capacity to that cooling capacity. If maximum flexibility is desired, it is best to install whips with conductors rated to the maximum power capacity that might be used. By installing 60 A rated whip cables, any desired breaker capacity (30-60 A) can be installed in the PDU and used for the power whip. This allows the data center manager to deliver the amount of power chosen "by the circuit" which is how many co-location facilities sell their power. The rack modulus (how many racks are powered by each pair of A-B power whips) of the grid is determined by the chosen per rack power densities. This can be refined further by choosing areas of the data center that have the best cooling airflow, to have the maximum power density. This allows lower design and material costs, because the whips required are only of two types and therefore can be produced in greater volume, reducing their price and making their layout design easier. The whip capacity can be matched to the cooling capacity, without having to worry about the exact type of power the end user needs in the rack. That is handled by the power delivery options of the Zonit ZPDU which allow power configuration changes to be made at the rack, not the PDU.

The Zonit methodology allows the data center designer to extend the design process to cover the layout of the power distribution system. This in turn helps insure consistent, repeatable, optimized results. The prefabricated materials help insure that installation costs are minimized, installation quality is maximized and errors are prevented.

Figure 5A:
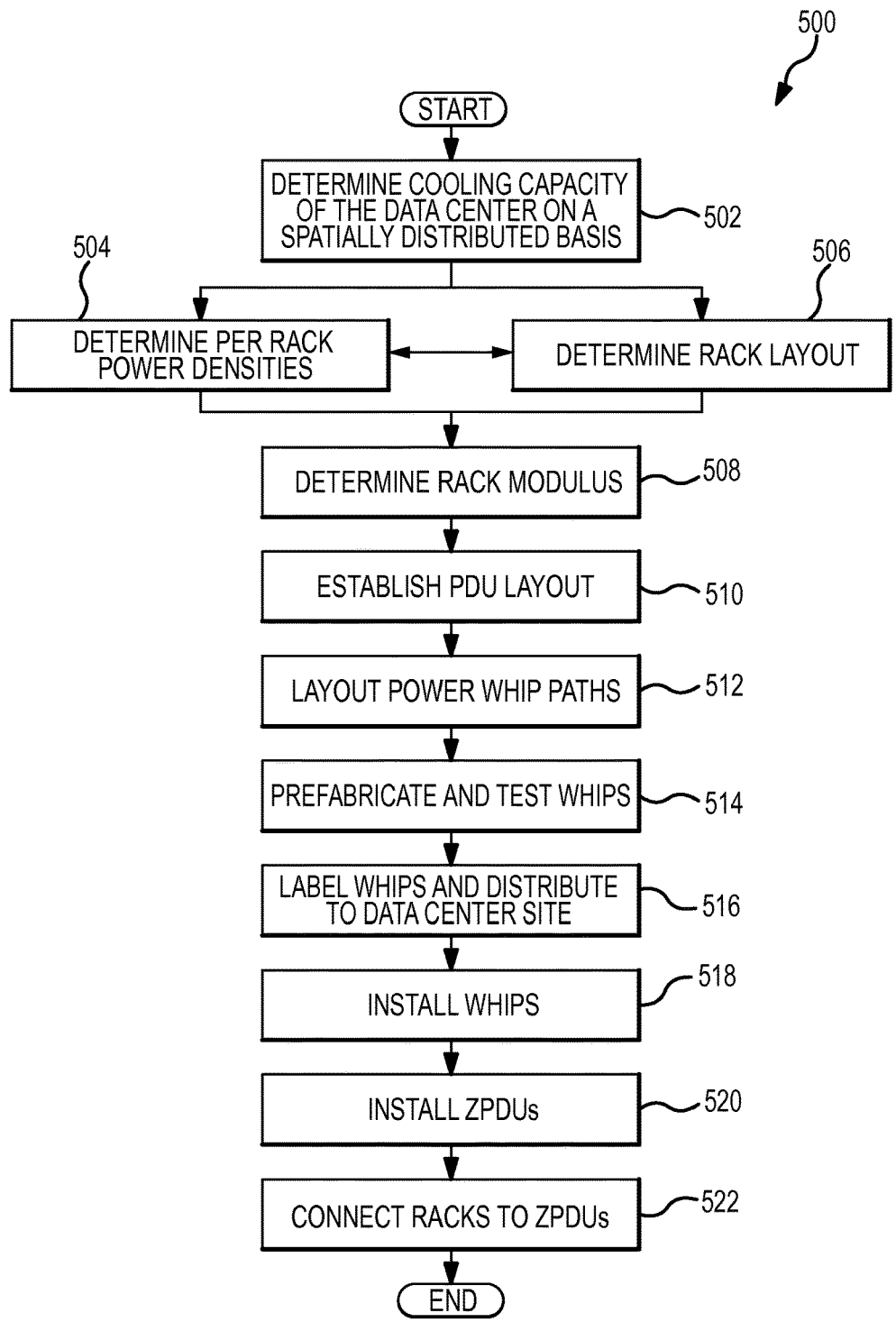
FIG. 5A is a flowchart showing a process for laying out a data center in accordance with the present invention.
Figure 5B:
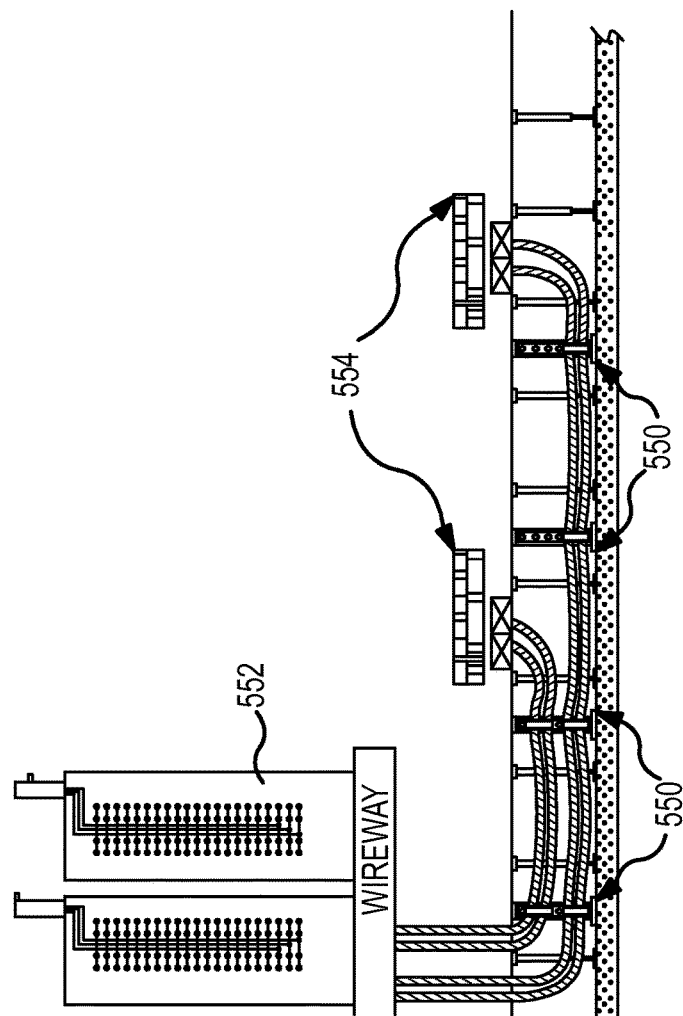
FIG. 5B shows a data center laid out with prefabricated whips in accordance with the present invention.

This process 500 can be summarized by reference to the flowchart of FIG. 5A considered in conjunction with the data center section view of FIG. 5B. The illustrated process is initiated by determining (502) the cooling capacity of the data center on a spatially distributed basis. In this regard, certain areas of the data center may have superior airflow or otherwise have greater cooling capacity. It may be desired to locate high power equipment or high power racks in these areas of the data center. The illustrated process 500 further involves determining (504) the per-rack power densities and determining (506) the rack layout. These two factors may be interdependent and may be determined jointly. That is, as noted above, different power densities may be provided for different racks, and the layout may be considered in relation to the spatially distributed cooling capacity of the data center.

Once the rack layout has been determined, the illustrated process involves determining (508) a rack modulus and establishing (510) a ZPDU layout. It will be appreciated in this regard that the number of ZPDUs required is a function of the rack modulus. The power whip paths can then be laid out (512). As shown in FIG. 5B, the layout for the whips 550 is a function of the number and location of the ZPDUs 554 as well as the location of the PDU power panel 552.

Once the length of the whips has been determined in relation to the layout, the whips can be prefabricated (514) and tested. Approved whips can then be labeled (516) and distributed to the data center site for installation (518). The ZPDUs can then be installed (520) and connected (522) to the whips so as to provide power to the racks.

B. Data Center Communication Cabling Issues

The limiting factor in modern data center deployment density is cooling. The cooling in modern data center racks is almost exclusively air cooling. Air cooling is limited by how much cooling airflow can be delivered to each equipment cabinet and effectively used. A major factor in managing this issue is the number of communication cables that need to be routed to and distributed in each equipment cabinet. A different cabling type can be used for each function within the cabinet, such as USB cables for door locks and sensors, fiber channel and Ethernet cables for data communication and additional cable for keyboard, video and mouse systems. These cables can occupy considerable space in the data center and the cabinet. These cables are rarely cut to the exact length needed, but rather are "stock lengths" with the excess contributing to the increased reduction of airflow. They can contribute very significantly to blocking cooling airflow. They also are so numerous that they become a challenge to install, document and maintain. The most common types of connectivity needed in a data center cabinet are TCP/IP connectivity (usually done via Ethernet), USB or Serial device connectivity (for environmental sensors, door lock status sensors, inexpensive video cameras, etc. and remote keyboard, video and mouse (KVM) connectivity. The system described herein addresses this issue in several different ways.

1. The Net-Zonit Netstrip as described PCT Application Number PCT/US08/57154 which is incorporated herein by reference delivers network and USB/KVM (including the required Protocol Gateway) functionality in one device.
2. The Zonit USB/KVM distribution strip 320 in conjunction with the Protocol Gateway feature of the ZPDU-G2 delivers USB/KVM functionality. The Z-Net (proprietary communications network) functionality of the ZPDU-G2 delivers supplemental limited bandwidth Ethernet and TCP/IP functionality, which is discussed below.

Figure 3B:
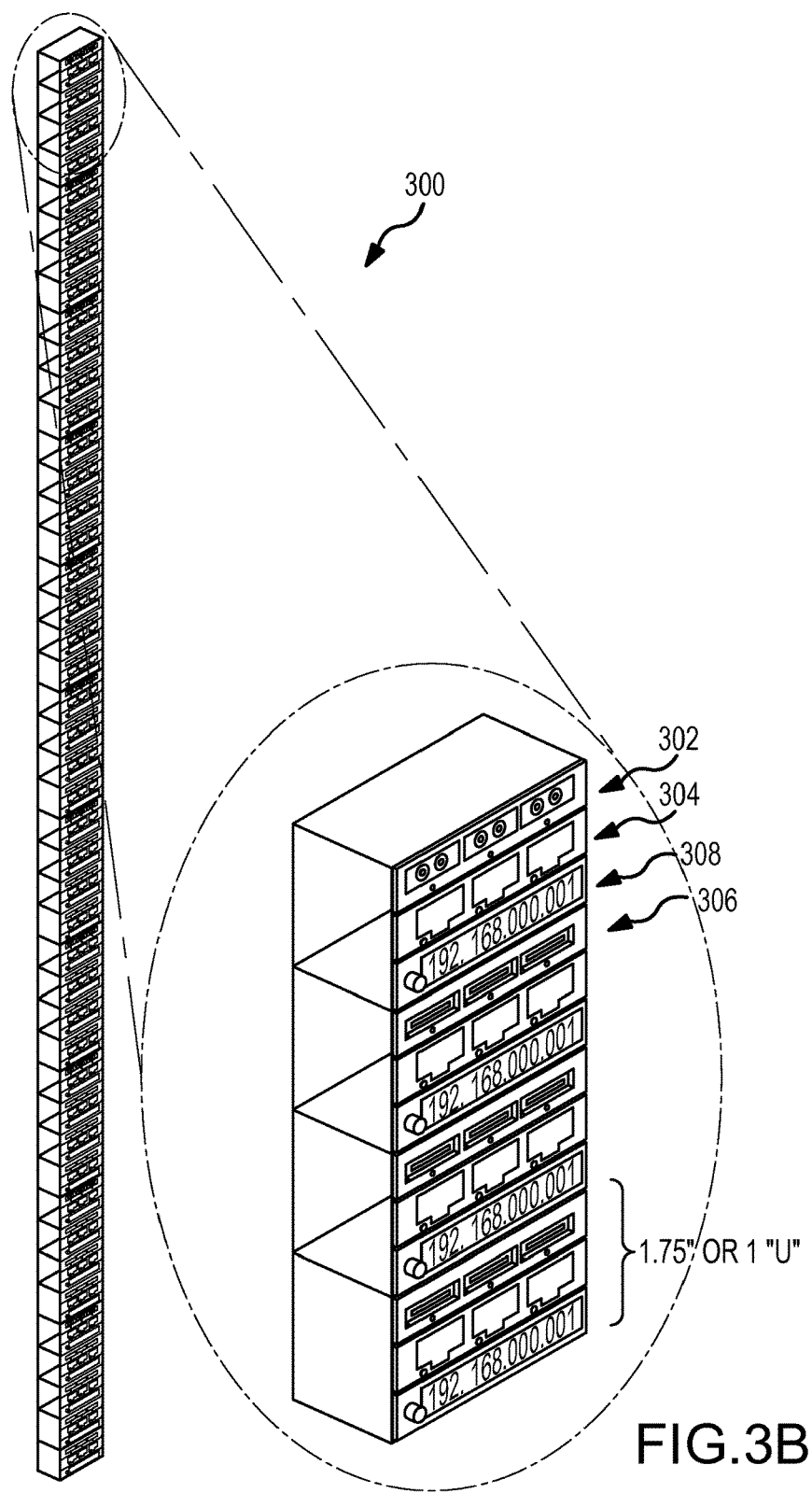
Figure 3C:
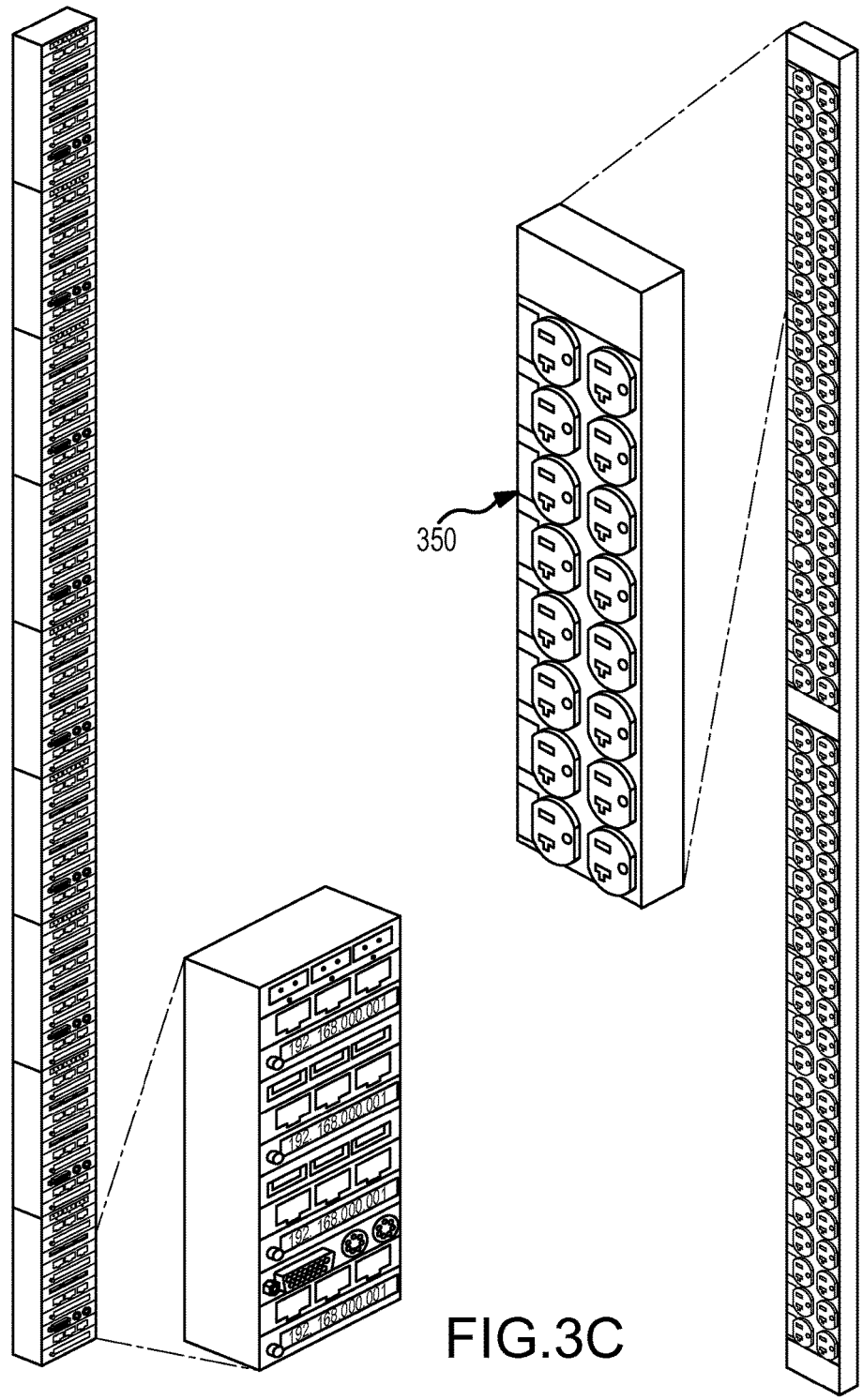
Figure 3D:
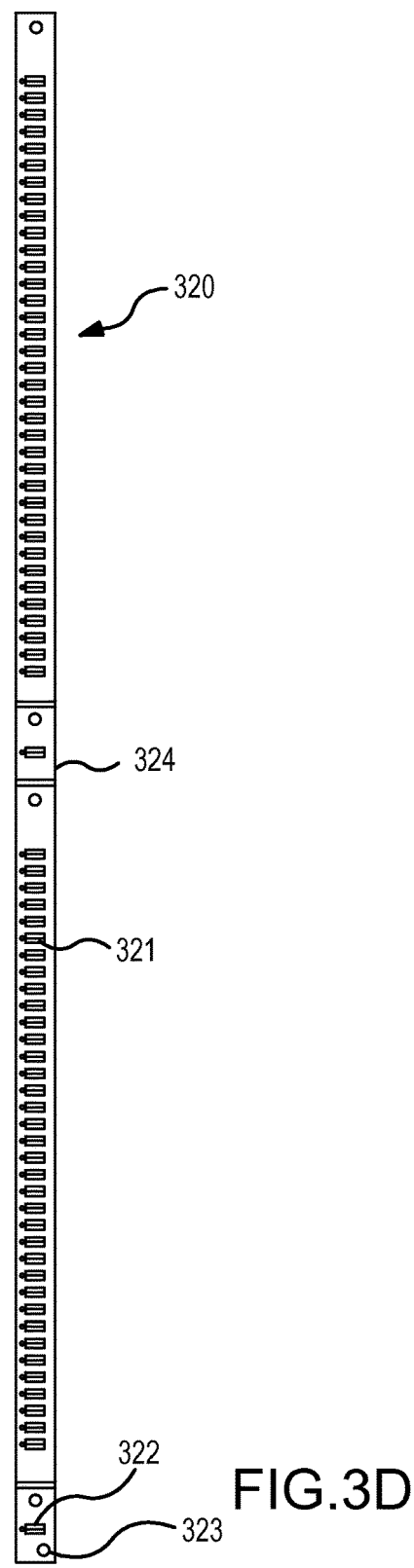
FIG. 3D show a USB/KVM port strip in accordance with the present invention.

The Net-Zonit Netstrip delivers unified network and USB/KVM connectivity. Any suitable types of network ports, industry standard or proprietary, can be supported. The ports (network, KVM and USB) can be integrated or inserted as needed using plugin modules, which allow the end-user to deploy ports when and where needed in the Netstrip and move them as necessary to insure cable length runs are minimized. In this regard, the illustrated Netstrip 300 (See FIGS. 3A-3C) includes fiber ports 203, Ethernet ports 304 (10, 100, 1000 Base T Modules) and USB ports 306. A KVM module can also be inserted as is shown in FIG. 3C. In addition, the Netstrip 300 includes displays 308 for displaying any desired information to data center personnel as will be discussed below. The Netstrip 300 is dimensioned to be vertically disposed in a rack 310, e.g., in a rear corner area 312 of the rack 310. The Netstrip 300 preferably extends across substantially the full vertical height of the rack 310 to provide ports at all height levels with minimal connecting cable length. The Netstrip 300 can be dimensioned to allow mounting to the rack with standard power strip hardware. In addition, the Netstrip can be provided in two or more sections (similar to the DoubleShot power strip described below) to facilitate mounting in crowded data center environments. In such cases, mating male/female connectors for all communications/power lines can be provided at the section interface(s).

The Zonit USB/KVM distribution strip in conjunction with the ZPDU-G2 (or modular appliance) Protocol Gateway functionality eliminates the need to run parallel data communication cabling systems for USB and KVM functionality. It does so by providing two key types of connectivity that are needed in the equipment cabinet, USB and KVM and eliminates the cable length limitations inherent in those systems. The system described here is a derivative of the NetZonit system that uses the Zonit ZPDU-G2 (or modular appliance) to provide the Protocol Gateway and network connectivity functions. The Zonit Netstrip functions the same as the ZPDU-G2 when performing the Protocol Gateway function for its USB/KVM ports but may have different throughput and uplink speed capacities. Only the ZPDU-G2 is used below in the description of the Protocol Gateway functionality, for purposes of brevity.

The Protocol Gateway provided by the ZPDU-G2 (or Protocol Gateway modular appliance, which will be assumed below in all references to the ZPDU-G2 in this role) is motivated by the desire to reduce cabling volume by eliminating the need for multiple cabling systems as explained above.

The protocol gateway functionality has several features.

1. Universal Serial Bus (USB) Virtual Connectivity

Each USB port on a Zonit USB/KVM distribution strip can be connected into a virtual "USB" bus. This bus is defined as a user-selected set of Zonit USB/KVM distribution strip USB ports and/or a set of Net-Zonit USB ports and/a set of Zonit Virtual USB Connectivity ports on computer workstations running this application. These ports are selected via a software interface on an application "Zonit Virtual USB Connectivity Manager" running on the Zonit ZPDU-G2 or a computer workstation or a dedicated Zonit appliance, which have TCP/IP network connectivity between them. The software interface can be done via a command line interface, Web interface or traditional GUI running on a computer workstation.

Each Zonit USB/KVM distribution strip USB port is connected to a USB interface device, such as a computer server USB port, a USB thermometer, USB video camera, USB door lock sensor, USB moisture sensor, etc. via a standard USB cable or USB device interface plug. The USB cables can be short since the rack mounted device will be close to the Zonit USB/KVM distribution USB port, reducing cabling clutter. If the device has an integrated USB port, no cable is needed and the device will just plug into a Zonit USB/KVM distribution strip USB port, which provides a useful self-mounting capability.

The serial data from a USB port is taken by the ZPDU-G2, encapsulated into a TCP/IP packet, and then routed to all of the other USB ports in the "virtual USB bus" which can be on any other Zonit USB/KVM distribution strip, Net-Zonit, or any computer workstation running a "Zonit Virtual USB Connectivity" application. At all the other USB ports on the "Virtual USB Bus" the data from the first USB connected device is de-encapsulated and then directed to the USB port(s) on the bus and/or to a virtual USB port in a connected computer running the "Zonit Virtual USB Connectivity" application. This application takes the incoming TCP/IP data stream, de-encapsulates the original USB data and presents it to the computer application designated to receive the USB data as if it were a local USB connected port. In this way any application or service that can take input from a local USB port can use the "Zonit Virtual USB Connectivity" application to receive it from a remotely Zonit connected USB port.

An important feature of the invention is bandwidth limiting. Based the uplink speed of the Zonit ZPDU-2 or the measured, inferred or user-defined network bandwidth between the two USB endpoints, the speed mode of the USB port or ports on the Zonit USB/KVM distribution strip will be set to be either USB mode 1.1 with a speed of 12 Mb/s or USB mode 2.0 with a speed of 480 Mb/s or USB mode 3.0 with a speed of 4.8 Gb/s. This helps to prevent the USB ports from oversubscribing the uplink capacity of the Zonit ZPDU-G2. The Zonit ZPDU-G2 may also utilize other bandwidth allocation methods to limit the amount of data traffic used by the USB Virtual Connectivity functionality.

2. KVM Functionality

The Zonit USB/KVM distribution strip supports a Keyboard, Video and Mouse (KVM) function as follows. The video output of an electronic data processing device can be connected via a KVM adapter to an adjacent USB port (which could be Ethernet or any other suitable data transport mechanism) on the Zonit USB/KVM distribution strip. The video to USB adapter can be used to digitize the analog output (or just input digital data for digital output video) and input it into the allocated USB port. The adapter also extracts the associated keyboard data, and mouse data and routes it via a Zonit Virtual USB Connection according to the user assigned KVM endpoint(s). The USB logic will then take the video data and encapsulate it into a TCP/IP packet, and hand that packet off to the network switch logic. It is then transmitted to the other endpoint(s) of the remote KVM connection. In this manner, the bi-directional data characteristics of KVM connections are managed and routed to the desired endpoints utilizing the USB Virtual Connectivity functionality of the Zonit ZPDU-G2.

The connection to the Zonit USB/KVM distribution strip KVM port from the EDP equipment can be done by a special KVM adapter cable. This is common practice. What is unique, is that the KVM video connectivity routing of the KVM connection is done with the USB virtual connectivity function and accomplished by the Zonit ZPDU-G2.

Each KVM port on a Zonit USB/KVM distribution strip can be connected into a virtual KVM connection to other Zonit USB/KVM distribution ports (or Net-Zonit USB/KVM ports), or a dedicated device or computer workstation running the "Zonit Remote KVM Application". This connection can be and usually is point-to-point or one-to-one-with-shadow-listeners. These virtual KVM connections are defined as a user-selected pairs of Zonit USB/KVM distribution KVM ports (or a Net-Zonit KVM port) plus a set of Zonit USB/KVM distribution strip KVM ports (or Net-Zonit KVM ports) that are in shadow mode and will all receive the video information. These virtual video ports are selected via a software interface on an application "Zonit Virtual Video Connectivity Manager" running on the Net-Zonit or a computer workstation or a dedicated Zonit appliance (like a ZPDU-G2), any two of which have TCP/IP network connectivity between them. The software interface can be done via a command line interface, Web interface or traditional GUI running on a computer workstation.

Alternatively, in instances where industry standard PS-2 keyboard and mouse data is not utilized, but rather those functions are transported over the USB interface to the attached computer(s), the keyboard and mouse functionality is handled directly by using a Zonit USB Virtual Bus Connection. This eliminates some complexity in the KVM adapter, and further simplifies the wiring. This connectivity is between a USB port on the EDP device being remotely KVM connected and a dedicated device (ZPDU-G2) or a computer workstation running the "Zonit Remote KVM Application". This application connects the remote USB port to the keyboard and mouse on the computer workstation in an appropriate manner so that the remote device "sees" the keyboard and mouse as being locally connected and active. It also takes the remote video feed and displays it on the computer workstation in the "Zonit Remote KVM Application" windows by un-encapsulating it from TCP/IP and handing it off to the Zonit application, which displays it. The application allows the user to select any of the remote EDP devices that are remote KVM connected and switch between them. The video for each can be displayed in a separate GUI window and the active GUI window in the application can indicate which remote EDP device is active and will receive keyboard and mouse input. This approach can be extended to multiple computer workstations (or dedicated device) so that multiple users can connect via the remote KVM functionality to the same remote KVM EDP device. Multiple users can be active at once or one can be active and the others in "shadow" mode with no keyboard & mouse input ability. This feature is useful for collaborative work or training A more direct method is to use a "plugboard" approach and use the video and USB connectivity between two Zonit USB/KVM distribution strips (or a Zonit USB/ KVM distribution strip and a Net-Zonit) to connect the EDP video and USB ports to a remote keyboard and video monitor. The switching function between EDP devices can be setup by the connected ZPDU-G2 which is controlled by the user via a command line interface or Web interface. The KVM logic in each connected ZPDU-G2 insures that each KVM connected EDP device "senses" a connected virtual monitor, keyboard and mouse when it is not actively connected to the remote actual monitor, keyboard and mouse as needed to insure normal operation. In all cases, since the ZPDU-G2 system has central management responsibility of the various virtual gateway functions, an environment of serial data, PS-2, or USB Keyboard and Mouse Datastreams can be routed appropriately with the attendant video stream associated with each. The end-points do not necessarily have to have the same physical interface as each other. For example, a USB based mouse and keyboard can communicate with a PS-2 host port in the virtual gateway of the ZPDU-G2 environment.

C. Data Center Communication Cabling Issues—Part 2

As described above, the limiting factor in modern data center deployment density is cooling, which was related to the issue of reducing the number of parallel cabling systems that need to be deployed in the data center and especially in the confined space of the equipment cabinet. The NetZonit and Zonit USB/KVM distribution strip were introduced as a method to reduce or eliminate the need for parallel data cabling systems and reduce the required cabling to the shortest lengths possible. We will now introduce the Z-Net method which is focused on the reduction of cabling for TCP/IP connectivity.

The Zonit Z-Net method is used in conjunction with the ZPDU-G2. Z-Net uses commercially available Ethernet over Carrier Current technology, as used in HomePlug®, but uses the ZPDU-G2 to provide a TCP/IP gateway function. This allows any TCP/IP Ethernet device plugged into a HomePlug® 1.0 or HomePlug® AV adapter which is inserted into a Zonit G1 or G2 plug strip to talk to any TCP/IP device that the ZPDU-G2 embedded controller (single board computer or SBC) can talk to. This greatly reduces or eliminates the need to run multiple network cables to the rack for accessory functions such as Ethernet interfaced environmental sensors, video cameras, UPS smart management cards or other data center infrastructure components. The bandwidth provided by the Z-Net system is limited, since the Z-Net system functions like an Ethernet hub (all HomePlug® adapters connected to the plug strips and/or adapters plugged into a single ZPDU-G2 will "hear" the signals on their power wiring, since it is a shared waveguide.

A key point is that each ZPDU-G2 filters out the HomePlug® communication signaling from all attached Zonit plug strips and adapters so that it stops at that ZPDU-G2 and is not transmitted up the A-B power feeds. This stops the HomePlug® signaling from being picked up by another ZPDU-G2 or HomePlug® connected device and limits the Z-net communications domain to only the HomePlug® devices connected to one ZPDU-G2. However, HomePlug® devices can be "chained" together downstream (by plugging one or more plugstrips sequentially together one or more of said plugstrips having one or more HomePlug® devices plugging into them) as needed. On any given set of branch circuits originating from one ZPDU-G2, connected devices can communicate via Z-Net. Limiting the domain of Z-net to one ZPDU-G2 raises the average per device bandwidth available, because without this filtering it would be impractical to use HomePlug® since thousands or tens of thousands of power receptacles are interconnected in a data center power distribution system with all of its branch circuits. This is equivalent to an Ethernet hub with thousands of ports, it just would not scale up and work, there would be too many collisions when all of the ports were trying to talk at the same time. Each ZPDU-G2 provides a TCP/IP gateway for each of its HomePlug® connected devices. The ZPDU-G2 also can act as a TCP/IP firewall for all HomePlug® connected devices if that security functionality is needed.

Figure 6:
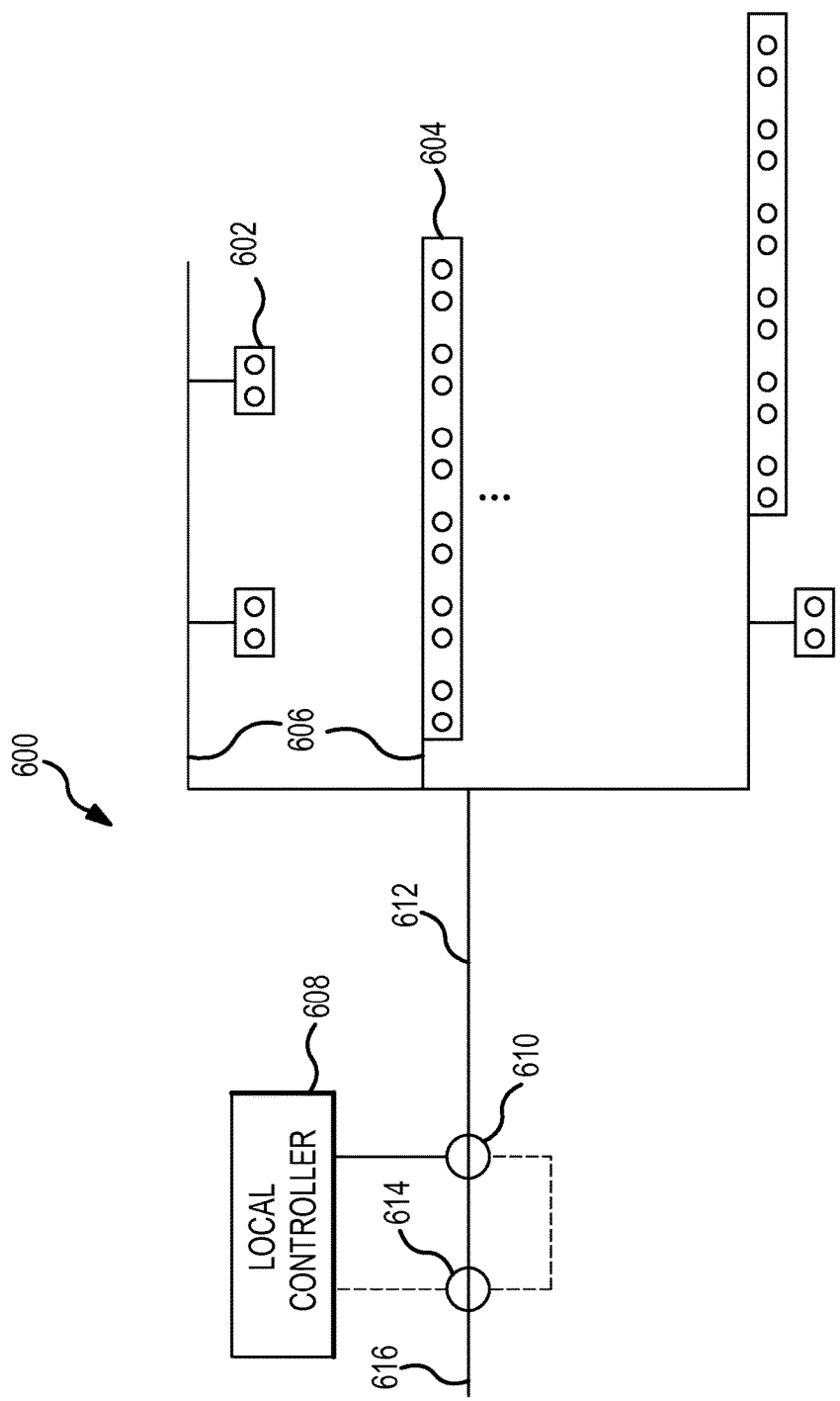
FIG. 6 is a schematic diagram illustrating a structure for enabling communications between receptacles and a local controller in accordance with the present invention.

In this regard, a single transceiver for each power source (e.g., A and B sources) of a ZPDU may be utilized to induce signals in the associated wiring and a single signal canceller or attenuator, as discussed above, may be utilized to substantially prevent transmission of communications to external power lines. This is generally shown in FIG. 6. In particular, FIG. 6 shows a control system 600 for a set of receptacles defining a controlled domain. The receptacles may include a number of receptacle outlets 602 and/or a number of plug strips 604 or adaptors (typical for data center environments) that may be arranged in one or more branch circuits 606.

The receptacles are controlled by a local controller 608, which may be, for example, embodied in a personal computer or in a single board computer incorporated into a PDU of a data center. The local controller uses a transceiver 610 to insert signals into the main 612 and branch circuits 606 for communication to the receptacles and to receive signals from the receptacles. A signal isolation device 614, which may be a signal canceller or a signal attenuator as described above, substantially prevents transmission of these signals to external (outside of the controlled domain) power lines 616. This structure may be replicated for A and B power sources in a data center. It will be appreciated that thus disposing all of the controlled receptacles on a single waveguide (or two waveguides in the case of a data center with A and B power sources) is a cost effective implementation. Communications with separate receptacles can be distinguished by use of an appropriate addressing scheme.

The signal isolation device 614, can be combined with the transceiver 610 as described in the following apparatus. A Pi filter is a device that is used to attenuate electrical signals in a conductor, usually an insulated wire. It contains a transformer core (inductor) and can be designed with additional windings for that transformer core to enable two additional functionalities.
  i. Current sense capability in the attached conductor
  ii. Insertion and detection of signaling in the attached conductor for communication purposes (a transceiver using the attached conductor).

The design of the additional windings can be done so that the injected communication signaling only is transmitted in one direction down the attached conductor and is attenuated in the other direction by the Pi filter.

D. Data Center Power Distribution Operational Issues

The operational issues a data center or co-location facility faces are many. Once the power whips have been specified and installed, the power requirements of each piece of equipment in each rack must be matched and met. New equipment will arrive over time and be installed and any new power requirements must be satisfied with little or no operational disruption, even if the power requirements are different. Equipment may be relocated in the data center to optimize cooling or meet other constraints such as cable lengths, physical security or ownership. A study by the Uptime Institute measured the change rate at the PDU for 49 Fortune 500 data centers and found that the annual change rate was 12% per year. It is very expensive but required by the traditional methodology to change 12% of the power whips in a data center and it is operationally disruptive.

The Zonit power distribution system was designed to meet the needs of the modern data center with a wide range of installed equipment and high rates of change. Over 90% of all Electronic Data Processing (EDP) equipment in a data center is designed to plug into a 20 A 120V single phase circuit. A more universal way of saying this is that this equipment will never require more than 2400 watts of power and typically will need much less. The remaining 10% of EDP equipment is higher power and typically needs 30-60 A input in 208-240V, in either single, split-phase, or three-phase power. So, ideally a perfect power distribution system is optimized to output power in the types and wattages required by the majority of the equipment but can also easily accommodate the minority of equipment that requires higher power capacity. This is exactly what the Zonit Power Distribution System does.

Changes to the power distribution system are difficult in the traditional approach and have varying degrees of risk. An ideal power distribution system will localize the changes to be made to minimize their risk and impact. It will also enable the changes to be made as easily as possible. Changes in a power distribution environment can be classified as follows:

TABLE 1

| Change | Difficulty | Cost | Risk | Locality of Change |
| --- | --- | --- | --- | --- |
| Replace or move power whip | highest | highest | medium | Only the whip is normally changed but routing a new whip is difficult and installed cabling can be damaged. |
| Change circuit breaker in PDU | low | medium | highest | An error can affect everything powered from that PDU |
| Change receptacles on whip | medium | medium | Low | Only the whip is affected and it is done when the whip is powered down. |
| Change receptacles in or at rack | high | high | low | Only the rack is affected. If downtime required it can be expensive. |

Table 1 shows that replacing or moving power whips is the hardest and most expensive task. This is true because there are many of them and the space they are routed in is very confined and can be shared with many other data center infrastructure elements such as network cabling, etc. It also shows that changing circuit breakers is the highest risk task, because an error can knock out the highest number of systems. So, our ideal power distribution system should eliminate or minimize these changes and risks as much as possible. Here is how the Zonit Power Distribution System accomplishes these goals.

1. Minimize Power Whip Changes
  The Zonit system does this in several ways.
    Whip layout is driven by and matched to capacity need not power or receptacle type. This is made possible by using three phase power distribution and Zonit's power phase balancing method. Three phase power can be used to deliver three-phase, split-phase, or single phase power, which covers 99.9% of the current AC powered EDP equipment types. DC powered equipment can be supported by using rack mounted AC to DC power rectifiers, which are N+1 modular in design (to match the Zonit system A-B power redundancy) and can be connected to the whips or the Zonit ZPDU.
    Installation of the whips is ideally done all at once, since the capacity planning is part of the design, and it is usually cheapest to do whip installation once, when the facility is built or upgraded. Other required Zonit apparatus is only bought and deployed as needed.

Power capacity can be matched to cooling capacity, which will determine the maximum possible power capacity. This means that you can deploy A-B 30-60 A capacity whips (choose the capacity needed for the maximum required power density) and use the ZPDU with Zonit plug strips and plug adapters to deliver A-B 20 A circuits from them in three-phase, split-phase, or single phase with whatever receptacle type is needed.

The power whip capacity can only be changed by changing the circuit breaker at the PDU. It is also possible to "downrate" a higher capacity power whip to a lower capacity by using a Zonit adapter that plugs into the whip and has circuit breakers in line to lower the capacity of the whip. This allows the whip to be used with EDP equipment that is rated to less than 60 A without changing the configuration of the power whip. An example of this would be a blade server that needs 30 A single-split phase power. A Zonit adapter with in-line 30 A circuit breakers can be plugged into a 60 A power whip to allow a blade server that needed 30 A power to be connected without changing the power whip.

2. Make Power Configuration Changes at the Rack, not the PDU

Power distribution changes are done at the rack by use of a "configuration layer" which encapsulates the changes and makes them easy to accomplish. This is done in the Zonit system by the Zoned Power Distribution Unit (ZPDU) combined with Zonit plug strips and/or plug adapters or Zonit plug adapters which plug directly into the A-B power whips. Which method is used depends on the target power level. Any device that needs 20 A (three-phase, split-phase, or single phase) is fed from the ZPDU. All other devices are powered directly from the power whips via appropriate Zonit plug adapters and phase rotators. The power whips can be configured at the PDU with circuit breakers to match the intended application or they can be "downrated" to the appropriate level with Zonit inline plug adaptors that incorporate circuit breakers.

Figure 7:
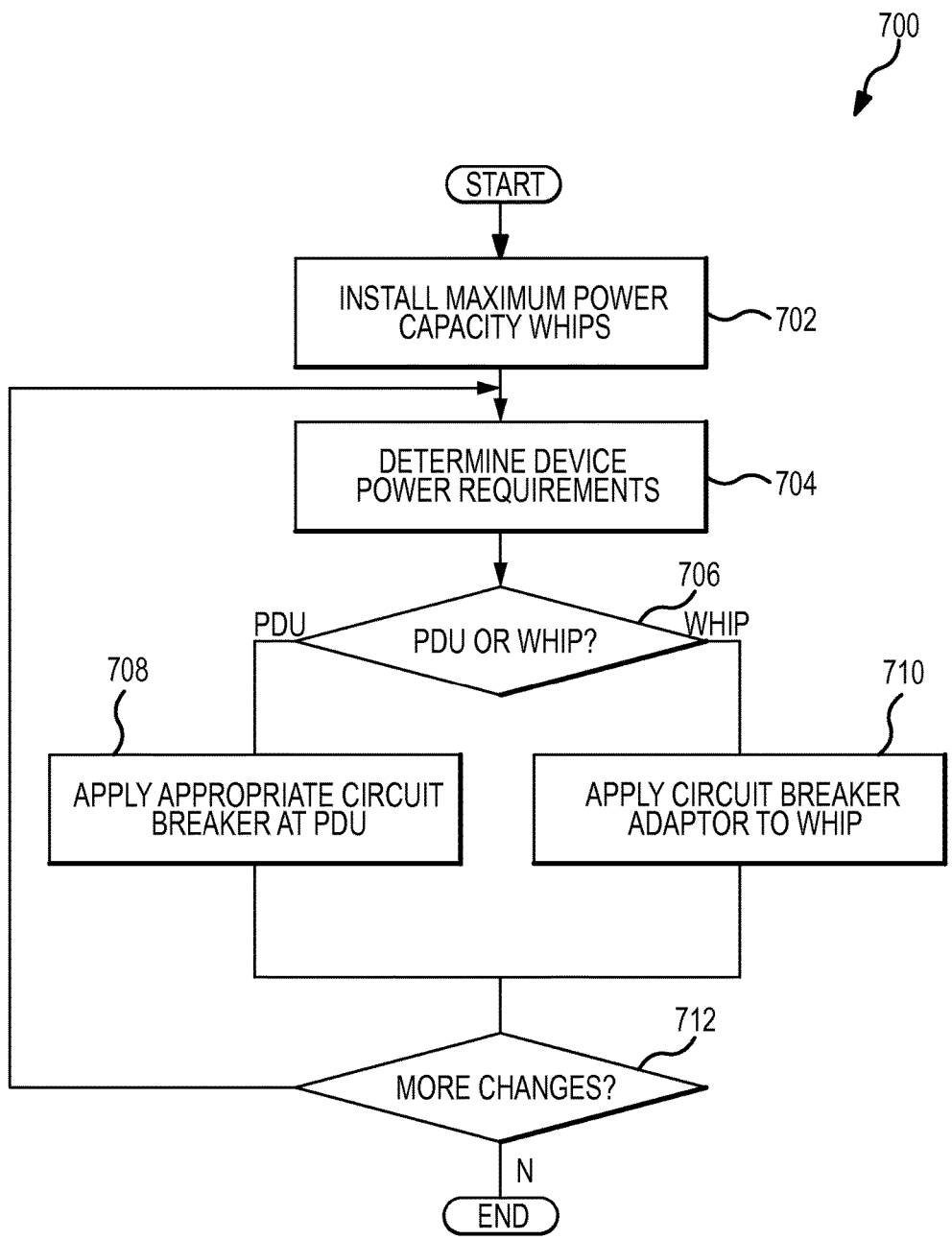
FIG. 7 is a flowchart of a process for matching a power supply from a whip to a piece of data center equipment in accordance with the present invention.

The Zonit Power Distribution system allows the needed power configuration changes to be made quickly at minimum cost, with the least risk. An associated process 700 can be summarized by reference to the flowchart of FIG. 7. The illustrated process 700 is initiated by installing (702) whips having the maximum expected power capacity. In this regard, as noted above, it is anticipated that whips rated for 60 A would be sufficient for many data center applications. It will be appreciated that whips with different ratings may be utilized in this regard.

Thereafter, the power requirements are determined (704) for a particular device. Subsequent processing depends on whether the device is connected to a PDU or to a whip (706). In the case of a PDU, an appropriate circuit breaker may be applied (708) at the PDU supplying power to the equipment. In the case of a whip, a circuit breaker adapter may be applied (710) at the whip. If more changes are required (712), this process may be repeated.

E. Data Center Power Reconfiguration Issues in the Cabinet

The increasing density of data center environments has raised the difficulty of mounting power distribution system components in equipment cabinets. The cabinets tend to hold more devices on average and be fuller. This reduces the amount of working space (which is very small to begin with) in the cabinets and makes it more difficult to mount power distribution equipment such as power strips (sometimes called plug strips or power distribution units). To increase the power capacity in an equipment cabinet or change the receptacle type, may require that a plugstrip be removed from the cabinet and another installed. Or it may require that additional plug strips be installed. The basic determinant is how much and what kind of power is needed and how many & what kind of receptacles are needed to distribute it.

There are three basic elements of power distribution in an equipment cabinet;
 1. Capacity: How much power can be delivered to the cabinet
 2. Circuit Subdivision: How that power is subdivided into branch circuits and what amount and type of power (amperage, voltage, single phase, split-phase, or triple phase, etc.) those circuits deliver.
 3. Receptacle Type and Count: What type of receptacles each circuit uses to deliver its power and how many there are of each type.

A key to meeting data center power distribution needs is to have flexibility in these elements, but do so in the least cabinet space possible. Provisions for mounting and power distribution methods that allow changes to be made with the minimum disturbance to equipment mounted in the cabinet, in tight working quarters are also crucial.

The average equipment cabinets in use worldwide range mostly range between 72"-84" high. These provide between 40-48 U of rack mount space. Rack space is very valuable because of the high capital and operating costs of data center floor space and associated infrastructure. Therefore the preferred method for mounting power distribution components such as plug strips is to use methods that do not consume any space that could be used to mount EDP equipment. A very popular method is to mount these components in the sides or back of the rack, outside of the space (a rectangular solid space which occupies the central area of the cabinet defined by the standard cabinet width [19 or 23" in NEMA standard cabinets] by the depth of the cabinet [24-39"] by the height of the cabinet,) used to mount EPD equipment. A common way to distribute power in this fashion is to use vertically mounted plug strips that have the needed type and number of receptacles. These plug strips are long enough so that they can be mounted in the cabinet and each receptacle is near an associated 1 or more "U" of rack mounting space, while being less than the vertical height of the cabinet. However, the long vertical dimension of the plugstrip, which can potentially be close to the height of the cabinet so that it can supply the full height of the cabinet with receptacles, can be very hard to get into and out of the cabinet. If a long plugstrip needs to be changed, it may be necessary to remove equipment from the cabinet to do this, which is both inconvenient and may require expensive downtime, which is hard to schedule and potentially expensive. Therefore it is desirable to use methods that minimize or eliminate the necessity of changing the plugstrip location or mounting arrangements (how it attaches to the cabinet).

The present invention provides a solution to this market need that is both elegant and inexpensive. It can be used with any suitable existing equipment mounting racks or cabinets or integrated as a part of an equipment rack or cabinet design. This solution is referenced herein as the Zonit Single or Multi-Density Plugstrip Methodology. ("Zonit plugstrip method"). The Zonit plugstrip method allows any single feed substantially full-height vertical plugstrip to be replaced by multiple interconnectable plugstrips, e.g., a pair or more of vertical plug strips, that can use the same mounting brackets that the single plugstrip used and can optionally double (or triple, quadruple, etc.) the power density. Note that the Zonit plugstrip method can be used with different sized module options. The modules can be sized to be 1/N where N is the number of modules needed that make up the plugstrip. Different sized modules (combined with end-cap mounting brackets adaptors if needed, as described below) can be combined. For example a half-height module could be combined with two quarter-height modules and the required quick connect power modules to make a plugstrip. The choice of module size(s) to use is driven by the amount of power capacity per module (and module receptacle) that is needed for the application. The only restrictions on combining modules are that the space needed to mount them must be available, vertically or otherwise. The following description assumes the simplest case two half-height plugstrip modules. Some quarter-size module options are shown in FIGS. 4d, 4e and 4f.

Figure 4C:
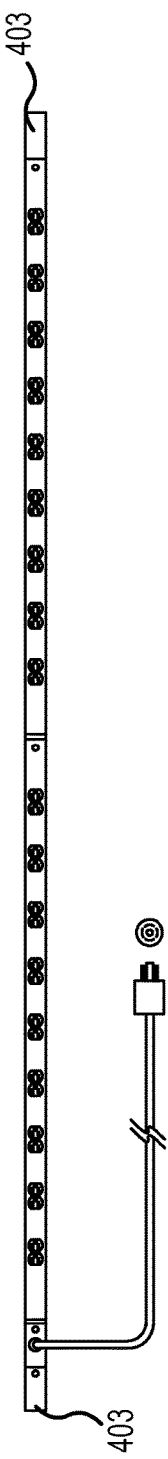
Figure 4D:
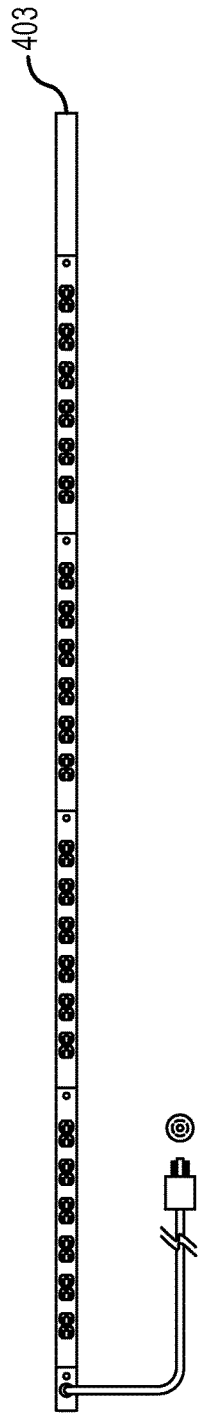
Figure 4E:
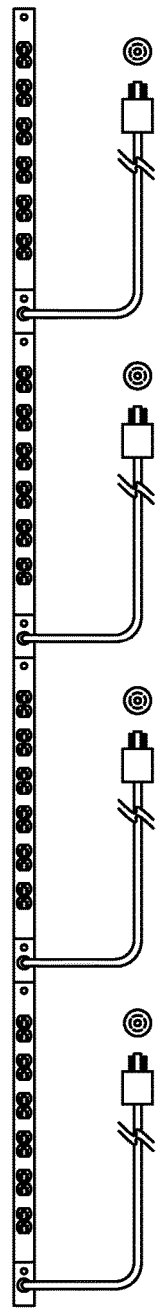
Figure 4F:
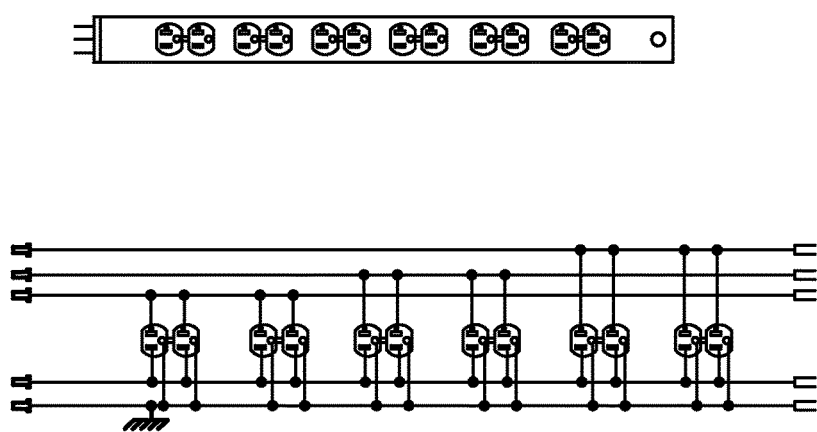

The pair of vertical half-height plug strips 400 as shown in FIGS. 3A-4C are designed so that they have the same mounting attachment points as the single vertical plugstrip and work with the same mounting hardware. The two half-height plug strips 400 are built with a universal design so that only one model of plugstrip is needed and with appropriate options can be used in any of the possible configurations. Each plugstrip 400a or 400b can be reconfigured so that the plug strips can either be fed power individually (FIG. 4A) or as a pair (FIG. 4C). They are joined together vertically by connecting together (FIG. 4A) or by a quick connect mechanism 402 (FIG. 4C) that fastens the two plug strips together and provides a power input. The associated wiring is shown in FIG. 4B. When joined together by either method they form a single unit that mounts in the same dimensions as the single plugstrip. In some cases the joined pair may be of slightly different physical dimensions, so in these cases an end cap mounting bracket adapter (403) may be supplied. This adapter attaches mechanically to an end of the assembly and makes the unit fit the mounting brackets so it can use the same mounting hardware. If a pair of plug strips is sharing one power input, they are also connected together electrically as is described below.

The method of electrical interconnect, while described for two half-height vertical plug strips, can be adapted to any suitable shape of plugstrip, such as horizontal plug strips (which mount in a rack in the space used by EDP equipment) which stack and attach vertically or horizontally back to back. The methodology described works the same and has the same benefits. The only difference is in mounting method, although this could be adapted also for a set of vertically stackable horizontal plug strips (where two half-height horizontal plug strips replace one full-height horizontal plugstrip).

In the illustrated system, each half-height plugstrip can play one of three roles:
1. Individual Half-Height Plugstrip—In this configuration, the plugstrip is used as an individual unit. It has an input power cord via the quick power connect.
2. Primary Half—In this configuration, the plugstrip has a power input cord and is connected to a power source via the quick power connect.
3. Secondary Half—In this configuration, the plugstrip draws its power from a primary half plugstrip to which it is connected. It does not have an input power cord.

The universal half-height plugstrip design has several elements.

Mechanical Connector Mechanism
Each plugstrip is designed to be mechanically connected to either another plugstrip or a power quick connect. Each plugstrip has an insertion end and a receiving end, which slide together and can be securely fixed via a hand-operated fastener. The power quick connect has the same connector design and therefore allows a power input cord to be easily connected or removed. Since the cord is modular it can be attached or detached as needed so that the plug strips can be reconfigured to be in either mode.

Electrical Connector Mechanism
The electrical connectors are designed so that the system is always in a safe configuration. Each plugstrip has a male electrical connector on one end (which is always engaged when the plugstrip is in use in either mode) and a female electrical connector on the other end which only used when the plugstrip is configured as a secondary plugstrip. This arrangement insures that no male conductors are exposed when the plugstrip is energized. Additional pins in the electrical connector can be used to do logic and state signaling in the intelligent plugstrip models. This informs each plugstrip logic controller of which mode it is configured in, primary or secondary. It should be noted that in the Zonit G2 system, signaling can be transmitted over the power wiring, which insures that both primary and secondary plugstrips receive that signaling.

Quick Power Connector
This is a combination modular power input and a mechanical connector. It is used with all primary configured plug strips. Additionally it is used to mechanically connect primary-primary configured plug strips. It mechanically has a receiving end and an inserting end which are the same as the mechanical connectors on the plug strips. The power input function is accomplished by have only one female electrical connector on one end of the quick power connect. This can only connect to a male electrical connector on a plugstrip. Since the input power cords can only plug into a male connector, it is impossible to electrically connect two primary configured plug strips together.

Uniform Mounting Dimensions and Methods
The mounting attachment points and dimensions are designed so that any mounting hardware that works with a single full-height plugstrip will work with a pair of half-height plug strips, interchangeably. Since the insertion of the power quick connect changes the vertical length of the plugstrip pair slightly, multiple mounting holes are provided to accommodate this change in length and still allow it to mount using the same hardware.

ASCII Configuration Key
QP—Quick Power Connector
PH—Primary configured half-height plugstrip
SH—Secondary configured half-height plugstrip
+—Indicates components are connected as described in document The combinations of plug strips that are valid are as follows:
1. One Individual Primary Half-Height Plugstrip
In this configuration, a mounting adapter can be used to allow the plugstrip to mount into the same brackets that a full-height plugstrip uses. It has a quick power connect that supplies the input power but no second plugstrip is connected.

Configuration—QC+PH

2. Two Primary Half-Height Plug strips (Primary-Primary)

This is two primary half plug strips each of which has a quick power connect on their male ends. The quick power connect between them only can connect electrically to one plugstrip but mechanically connects the two plug strips together.

Configuration—QC+PH+QC+PH

3. One Primary and One Secondary Half-Height Plug strips (Primary-Secondary)

In this configuration, each half plugstrip is connected together mechanically and electrically. The secondary plugstrip draws its power from the primary plugstrip by connecting its male connector to the female connector on the other plugstrip.

Configuration—QC+PH+SH

4. One Primary Half-Height and as many Secondary Half Height Plug strips as required. (Primary-Secondary-Secondary- . . . )

In this configuration, the primary plugstrip feeds as many secondary plug strips as desired. This is a novel feature, but would usually be restricted to unusual situations such as when the plug strips were used outside of a rack, for example lying on top of a long laboratory test bench.

Configuration—QC+PH+SH+SH+SH+ . . . (as many SH as needed)

This methodology has several advantages;

1. The single full-height plugstrip in the rack can be replaced with two half-height plug strips in the same space (with a slight difference in vertical height, depending on whether the pair is configured primary-primary or primary-secondary), that use the same mounting hardware. In addition, a single half-height plugstrip can be replaced with two quarter-height plugstrips as shown in FIGS. 4D and 4E. With appropriately designed mounting hardware that does not need to be removed from the rack to change the plug strips, this means that the plug strips can be replaced or reconfigured without changing the mounting brackets or plugstrip location in the rack, a real benefit.

2. The two half-height plug strips replacing the single full-height plugstrip can each have an independent power input, so the number of circuits feeding the receptacles can be doubled. This feature can be used to increase the power capacity and per receptacle power budget in the same exact location and space in the rack, so it provides a very convenient growth path as deployment density increases over the lifetime of a data center.

3. Two different types of circuits (for two primary half-height plug strips) and/or different types of receptacles (for single phase, split-single or three phase fed primary or secondary plug strips) can be used to deliver power in the rack using the same mounting brackets and plugstrip location, which is another gain in flexibility. Note that in our design, while a plugstrip module could use a single power phase from the ZPDU, it can (and usually will) be built with the wiring and connectors needed to deliver and pass (FIG. 4*b*) through all three phases, allowing other types of plugstrip modules that use two or three power phases to be connected to form a plugstrip.

4. In crowded racks, it is easier to get two half-height (or four quarter-height) plug strips into the rack and then connect them together than trying to get one large full-size plugstrip into the rack. This can be very important in very crowded racks where changing out plugstrip types can be difficult or impossible without removing already installed and running data processing equipment, which may require difficult to schedule and potentially very expensive downtime.

This plugstrip design offers great flexibility and improved ease of use to data center operators. They can use either single or double density plug strips in the exact same space and interchange them without changing the mounting hardware in the equipment cabinet. They can intermix different circuit and receptacle types of any type when using two primary configured plug strips and can intermix receptacle types for a primary-secondary configuration when using single phase, split-single or three-phase fed power, again without changing the cabinet mounting hardware. This method makes power distribution configuration changes in the equipment cabinet easier and quicker to do. The net result is reduced costs, effort and potentially downtime.

Figure 15:
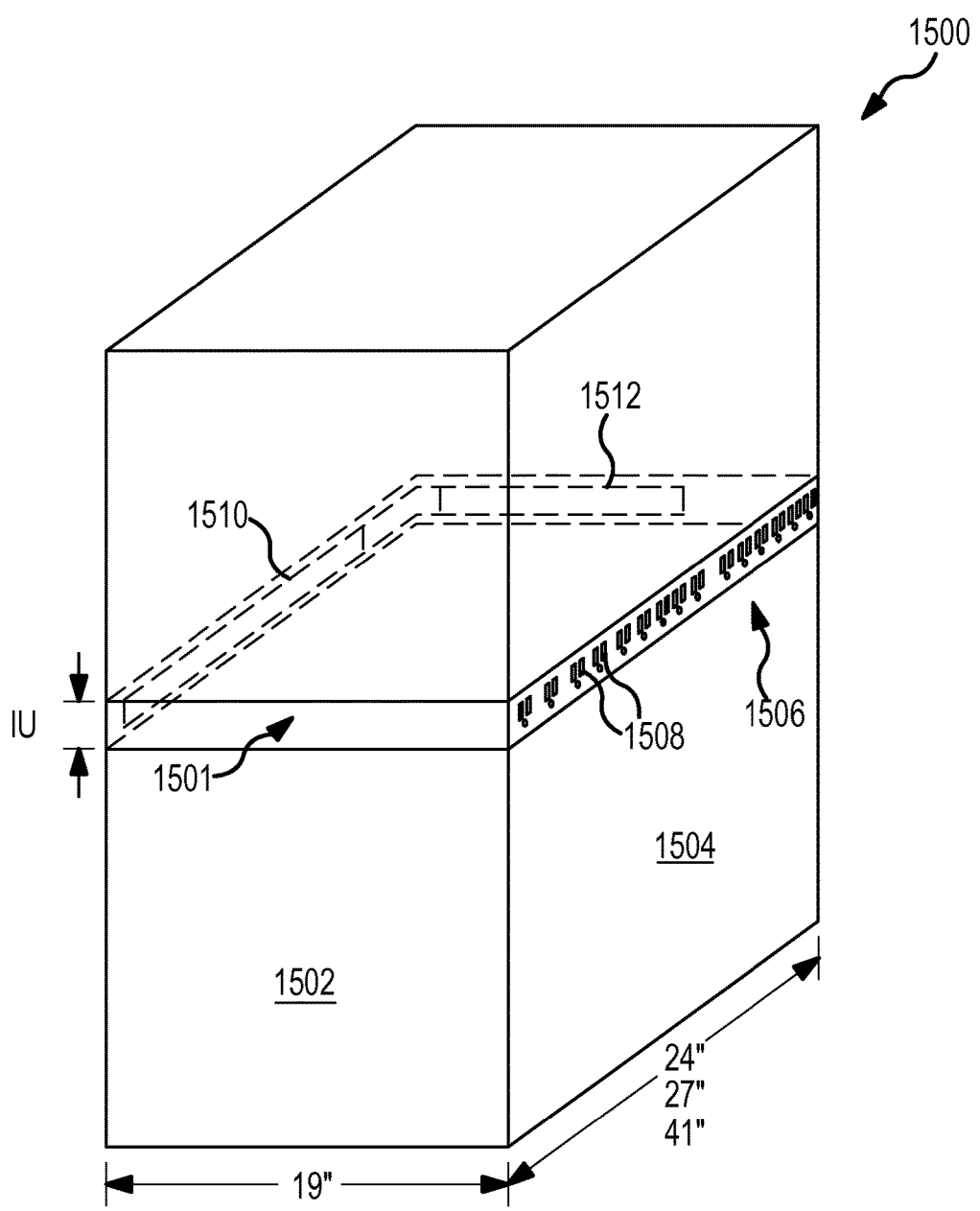
FIG. 15 is a perspective view showing side mounted power strips in accordance with the present invention.

These power supply issues in crowded data center environments can also be addressed by a side access receptacle system. An embodiment of the side access system is shown in FIG. 15. In the illustrated embodiment, at least one power strip 1506 is mounted on a data center equipment enclosure 1500. As disclosed above, the enclosure may be, for example, a rack or a cabinet. In any case, the enclosure 1500 includes a number of equipment mounting slots 1501, only one of which is shown in the drawing for clarity of illustration. The illustrated enclosure 1500 is a cabinet having a front 1502, a back opposite the front, a first side 1504 and a second side opposite the first side 1504. The cabinet will typically have a rectangular configuration. In this case, the cabinet front 1502 has a side-to-side width of 19 inches. The first side 1504 has a depth that is generally greater than the width of the cabinet front 1502.

It will be appreciated that cabinets of different widths and depths are common in data center environments, and the power strip 1506 can be made to accommodate any such cabinet. In the illustrated embodiment, the depth of the cabinet may be, for example, 24 inches, 27 inches or 41 inches. Thus, it will be appreciated that the depth of the cabinet is generally greater than the width of the cabinet so that the power strip 1506 can accommodate more outlets 1508 as may be desired. In the illustrated embodiment, the power strip 1506 may include, for example, more than 10 outlets. In the case of a cabinet having a 24-inch depth, the power strip 1506 may include at least 14 standard NEPA three-prong outlets disposed in a single row on the power strip. Where the geometry of the enclosure 1500 allows, the power strip 1506 may have outlets disposed in more than one row for even greater capacity. In the illustrated embodiment, the enclosure includes shelves having a height of 1 u. The power strip 1506 is dimensioned to be utilized in connection with a shelf of this dimension.

As shown, a second power strip 1510 may be disposed along the second side of the enclosure 1500. In this manner, a greater number of outlets can be provided in connection with the shelf. For example, the second power strip 1510 may be substantially identical to the first power strip 1506. Alternatively, the power cord for the strips 1506 and 1510 may extend from opposite ends of the strips 1506 and 1510 for mirror image right side/left side configurations. Moreover, the first and second power strips 1506 and 1510 may be associated with separate power sources. As noted above, for certain critical equipment, it is desirable to have power alternately supplied from first and second sources to ensure continuous operation even in the case of a power outage of one of the sources. For example, one of the sources may be a failsafe source. Such equipment often includes first and second power cords. In the illustrated embodiment, one of these power cords may be plugged into the first strip 1506, and the other power cord may be plugged into the second strip 1510. These strips 1506 and 1510 may then be connected to separate sources, for example, via a power distribution unit (not shown).

Alternatively, the first and second power strips 1506 and 1510 (which are still associated with separate power sources) may be powering equipment via an automatic switching unit 1512. Generally, the automatic switching unit 1512 senses a power failure in connection with a power source (associated, in this case, with one of the power strips 1506 or 1510) and automatically switches to an alterative source (associated, in this case, with other power strips 1510 or 1506). In this manner, all of the equipment may be connected to two power sources even though the equipment may have a single power cord.

Although the power strips 1506 and 1510 are shown as being disposed at side edges of the enclosure 1500 and being aligned with a front-to-back axis of the enclosure 1500, it will be appreciated that the strips 1506 and 1510 may be spaced a distance from the side edges, e.g., to provide space for plugs and power cords. In addition, the strips 1506 and 1510 may be angled relative to a front-to-back axis of the enclosure 1500, for example, to accommodate more outlets or to facilitate access to the outlets from the back of the enclosure 1500, as may be desired.

F. Data Center Power Management, Monitoring and Security Issues at the Receptacle Power monitoring and management at the receptacle level is a feature that is in increasing demand, especially in the data center market. The shift in understanding of power as a cheap utility commodity to an expensive resource with associated environmental and climate impacts is well underway. This combined with rapid power consumption growth (from less than 1% of US annual power usage to soon over 3%) in data center environments has driven a demand for the ability to monitor power usage. The other basic feature that data center managers want is the ability to remotely switch power receptacles off and on. This is especially useful for co-location facilities or "lights out" data centers that have little or no operational staff located on site. These are features that the Zonit Generation Two plug strips will provide.

Many data center managers come from facilities operations backgrounds and do not have strong Information Technology (IT) backgrounds. IT security is even more problematic for such managers as it requires a multi-level understanding of IT infrastructure to grasp the pros and cons of various IT security issues. Further, very few data center managers have IT security expertise on their staffs and must rely on corporate IT resources for this area. This makes them uncomfortable with the potential of an attacker cracking into the power distribution management systems and gaining control of the ability to remotely turn off power to devices in the data center. This is their direct responsibility and something they will be held accountable for even though they don't have direct reports with the skill to implement and maintain the IT security needed to insure attackers will be kept out.

The result of this situation is that although most data center managers would prefer to have both per receptacle monitoring and switching capabilities, they are afraid of attackers gaining control of the receptacles and switching them off. The market has responded by providing two kinds of plug strips, those that can be monitored and switched and those that can only be monitored. This forces the data center manager to choose which kind of plug strips he wants at deployment time and if he needs for some reason to switch from one type to the other he has to change out the plugstrip(s) which are affected which is both awkward and usually forces him to buy more plug strips than he wants to so that he has both kinds available when needed.

Figure 8:
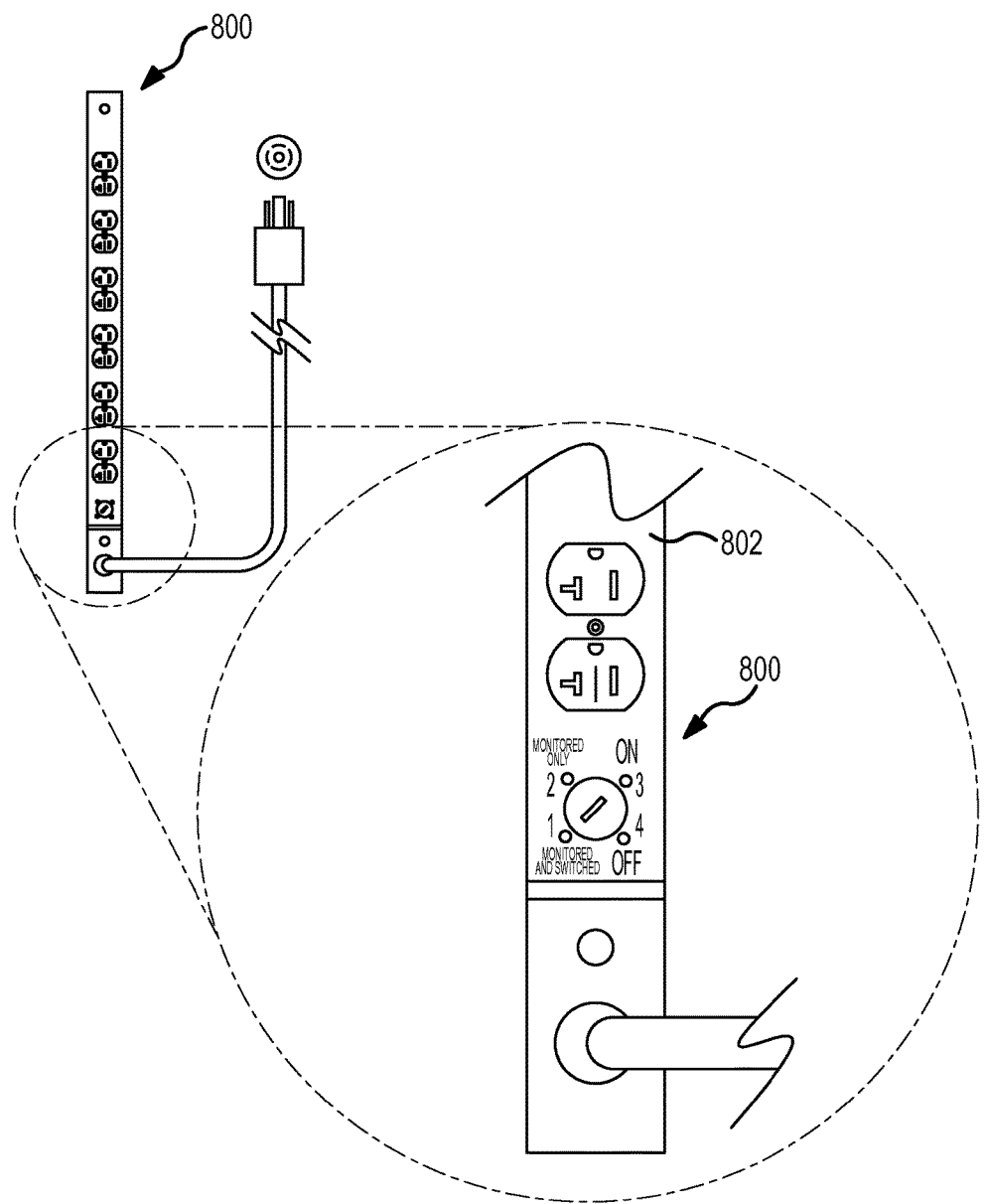
FIG. 8 is a perspective view of a key switch power strip in accordance with the present invention.

The solution we have invented to this market demand is both elegant and secure, and is referenced below, as the Zonit Secured Mode Plugstrip. The Zonit Power Distribution System—Generation Two, 1 incorporates per receptacle monitoring and switching in its plug strips. The receptacle is switched on and off via means of a relay. The relay is actuated by a separate control circuit, which can be controlled remotely, via a Web interface or other means. The relay control circuit is inserted between the logic controlled power switching and the receptacle via a simple multi-position switch, which may be implemented as a key controlled switch 800 (FIG. 8) for security, although a non-lockable switch could be used. It is manually operated and any desired combination of positions. Our example has four positions:

1) All Receptacles Monitored & Switchable On/Off
2) All Receptacles Locked to last set On/Off configuration & Monitored All Receptacles Powered On & Monitored All Receptacles Powered Off The switch is a security override that can only be controlled manually. It controls the functional behavior of the receptacle or in the case of a plugstrip 802, receptacle(s) as follows:

1. In position 1, the override switch is closed and the relay logic control circuit controls when power is directed to the Form A relays. The power is used to open the relay(s), turning the receptacle(s) off for a moment or indefinitely which either power-cycles the attached device or shuts it off. This position also allows status of each receptacle to be monitored.
2. In position 2, the override switch is set to a position that tells the plugstrip control logic to not accept any new configuration commands. Receptacles stay in the on/off state that they were prior to the override switch being turned to position 2 and receptacle monitoring stays in its prior configuration for each receptacle.
3. In position 2, power to the relays from the control circuit is cut to the receptacles by the position of the switch. The receptacles can be monitored, but they can not be turned off because no control circuit power can be delivered to the Form A relays, regardless of the action of the control logic. In this position, all of the receptacles will be "on" always.
4. In position 3 the relay control circuit power is "locked" on, opening the Form A relay and turning off all of the receptacles. Again, it can not be over-ridden by the control logic, it is hard-wired.
5. Receptacle Power Status
    The LED's can be used to indicate the measured current draw at a receptacle via one of the methods discussed earlier, for example a blink pattern that is proportional to the instantaneous current draw. A unique indicator (for example two or more colored LED's lit at once or other visual indicator such as discussed earlier) can be used to indicate that the receptacle is not delivering any current, which can aid in quickly determining problems with equipment that is plugged in but not functioning.

It should be noted that this method can be used with other relay forms (B, C, etc.) and relays that are powered by AC power. The key point is using a switch mechanism as a security override of the receptacle control logic. The illustrated embodiment uses form A relays for better reliability (the relay is off when the receptacle is on, the most common state) and uses DC powered coils, but a relay that was AC powered could be used with this method as well.

This mechanism gives the data center manager the option to physically and securely select the functional mode of the receptacle or plugstrip, in a way and at a level that he is comfortable with and can absolutely trust. This in turn allows him to buy only one type of plugstrip that can serve in either role, managed and monitored or monitored-only, at the turn of a key. This is a significant improvement saving the data center manager, time, effort and money and avoiding operational disruptions.

An additional security is to implement the communications protocol (e.g., Z-protocol) directing the control logic for the receptacles as a proprietary secure method that is not published. It preferably has a simple robust encryption scheme and is separated from the higher level control functions (network connectivity and Web interface). It would be very difficult for an attacker to understand and corrupt. It would require physical access to the hardware and reloading of firmware, both virtually impossible for an attacker in an access controlled and monitored data center.

G. Data Center Unique User Interface Features

Co-location facilities or "lights out" data centers that have little or no operational staff located on site have certain operational needs relating to their use of power distribution in their facilities. Some data centers and co-location facilities are now reaching very large sizes, with up to or over 250,000 square feet. They have rows and rows of cabinets that go on and on. They all look similar except for labels, if present. The personnel who have access to equipment in racks can vary quite a bit in their degree of understanding, expertise and experience in working in data center environments. This is especially true in co-location facilities where client personnel as well (or in some cases only) have access to equipment and plug it into the power system when it is installed or moved.

The other variable in the market is the increasing adoption of three phase power at the cabinet, due to increasing power requirements. Three phase power is different than the traditional single phase power that most IT personnel are used to. What receptacle, phase and branch circuit you plug into can and often does, matter. There is more complexity that has to be managed and monitored. The chances for error are greater, especially with users who have never worked with three phase power distribution.

The present invention addresses this market demand by informing users at the cabinet level of information they need to work with the power distribution, but is remotely controllable via a Web interface. This means that a remote data center manager or operator can perform an action or an individual in the data center with Web access (phone, PDA, laptop, public computer, etc.) can perform an action that is reflected by what they see in the cabinet.

This is accomplished via one or more LED's (which can be white or colored) located next to a receptacle (or receptacles in the case of plug strips) or circuit breaker (in the rack or on the wall in a power distribution unit). The LED's have multiple functions, they can be used to illuminate or convey information based on their color, blink pattern or on/off state either individually or as a set or subsets. Alternatively or additionally, such information can be conveyed via an LCD or LED display 350 (FIG. 3C). Information regarding the power source (A or B), phase, or circuit association can also be provided by strip configuration (e.g., A and B sources can be in different columns) and color coding of the receptacles or adjacent face plate area.

This offers several unique abilities and many more can be developed:

1. Cabinet or Component Identification and Illumination

LED's are now available in high output, high efficiency variants. This makes it possible to brightly illuminate the interior of an equipment cabinet, which both identifies that cabinet and illuminates the interior of that cabinet to facilitate working in it. The interiors of cabinets usually don't have built-in lighting and also are poorly lit by room lighting, which is often dimmed to save energy. Also, illuminating a component makes it easy to identify.

2. Receptacle and Circuit Breaker Location

This offers the ability for a particular receptacle or circuit breaker to be specified from the Web interface and then identify itself by the blink pattern of the LED at that receptacle or circuit breaker. This insures that the right receptacle or breaker is identified when making a change to the power distribution configuration, such as when installing, removing or moving a piece of equipment. It is particularly useful with 3 phase power, since you can identify both the receptacle and the circuit breaker that controls it at the same time.

3. Receptacle Phase Location

This is a capability that is very useful in three phase power distribution. It is not trivial, especially for three phase novice to correctly identify the power phase that a particular receptacle or circuit breaker is on. The data center manager may tell a technician or custom, "Plug into phase X" based on what he is seeing at the three phase UPS, because he knows that three phase power loads should be balanced for best efficiency. However, the person who performs the change at the cabinet can have a hard time figuring out what receptacle is on what phase. The present invention makes this trivial, just use the Web interface to select a mode where the phase at the receptacle is displayed.

4. Receptacle and Circuit Breaker Status and Error Codes

LED's are usually used to indicate power receptacle or circuit breaker status, but they are usually only binary (LED lit=power on, LED off=power off). The ability to use them individually or in sets to indicate other types of information, (voltage low or high, branch circuit error, amperage level in/out of range, power quality in/out of range, many others) is quite extensive.

The present invention gives the personnel managing and working in data center environments a superior user interface to interact with each other and the power distribution system. The key points are that the LED's can be used in conjunction with Web interface(s) to enable a better way for the staff to reliably and correctly perform basic power distribution configuration changes and get information and direction and be informed of problems in the equipment cabinet.

H. Data Center Power Capacity Provisioning Management Issues

Power capacity provisioning management raises both operational and upgrades issues in a data center or co-location facility. This is especially true in co-location facilities because power is almost always sold by the branch circuit and provisioned to the equipment cabinet. The most common type of power sold is a 20 A, 120V single phase circuit which is provided with each cabinet or fractional cabinet. The problem with this type of deployment is that it is inflexible, requires power whip changes to change the capacity level and if the limit is hit, the resulting circuit breaker trip can take down all equipment connected to that circuit that does not have a redundant power feed.

These kinds of problems happen with equipment deployments more frequently than one might think. This is because few data center or IT staff measure or do the research on what amount of power each piece of equipment actually draws. This research is hard to do because manufacturers do not give power consumption figures for each possible optional configuration of their equipment and the worst case numbers that they publish are often very unrealistic. So, the prevailing method is "plug it in and see if it works!".

Another issue with traditional branch circuits is that they must be capacity over-provisioned to meet the peak demand, not the average demand. This occurs because the peak demand happens during a cold start scenario, when all of the equipment connected to the branch circuit starts up at the same time. The resulting load from power supplies drawing current and fans and disk drives spinning up is the highest load point. This means that all branch circuits can only be loaded up to around 80% of their rated capacity, so that they have sufficient headroom to handle cold-start current inrush levels.

The Zonit Power Distribution Methodology solves these power capacity management issues in a unique and useful way. The Zonit system method is to implement "Virtual Circuit Breakers" that can be applied to a single or any arbitrary set of Zonit system power outlets. The Virtual Circuit Breaker is a software limit that is implemented via a proprietary hardware apparatus at each receptacle, and is described in U.S. Provisional Application No. 61/372,752, entitled "Highly Parallel Redundant Power Distribution Methods," filed Aug. 11, 2010, which is hereby incorporated by reference. It functions under and up to the branch circuit breaker limit via a set of user selected policies. The power policy controls both the state of the receptacle (on/off) and how that receptacle acts individually and in a single or multiple set(s) of defined receptacles. The most common sets of defined receptacles are one individual receptacle, all the receptacles that are on one branch circuit, or all of the receptacles assigned to a particular client or any other functional or political division.

The enabling apparatus preferably has the following minimal capabilities:
1. Quickly measure and communicate power usage and voltage at the receptacle level. Other measurement points (such as at the input from the power whips) can be used, but are not essential. The measurement frequency and accuracy must be sufficient to allow a processing unit to compute if the branch circuit capacity is being overdrawn, and act on it before the actual branch circuit breaker trips.
2. A processing unit or units (it can be centralized or distributed and single or multi-level) that monitor and sum the current and/or voltage values. They are also responsible for the enforcement of the current power policies.
3. A method for allowing the processing unit(s) to determine which controllable receptacles are on which branch circuits. This can be done by the design of the topology of the electrical connections or how the communications protocol that talks to the receptacles works or a combination of both.
4. Receptacles that are on-off controlled, having the ability to be quickly turned on and off. The speed of response must be fast enough so that a receptacle can be turned off before a typical branch circuit thermo-magnetic circuit breaker would trip open in a mild to moderate over-current scenario.
5. The ability to allow the data center manager to identify to the processing unit which equipment is plugged into which receptacle(s) so that power policy decisions can be made on this information.

The Zonit Power Distribution Methodology allows the following functionality.
1. Power monitoring is used to determine if a branch circuit is about to trip its circuit breaker due to a change on the circuit (new equipment plugged in, existing equipment malfunctioning, etc.). If an over-capacity condition is present, the processing unit can preemptively act to prevent the circuit breaker from tripping by turning off one or more receptacles that are on that circuit. Which receptacles to turn off is a policy controllable decision, it can be last on, first off, a defined priority shutoff sequence, highest power drawing receptacle, the smallest load needed to get the power draw underneath the hard amperage limit for the circuit, etc., literally any pre-defined criteria can be used.
2. A given power limit is defined for an arbitrary set of receptacles in the facility. They could be, but do not have to be, on the same branch circuit. This is a capacity provisioning soft limit set using the Virtual Circuit Breaker and is useful for facilities such as co-location data centers that want to sell power by capacity limit and have the ability to change the limit as the customer pays for more capacity. This is very useful for such facilities. It can be combined with power reporting to show customers just how much power they are using and what units use the most power.
3. Control the order and timing of receptacles and/or adapters being turned back on either as load drops or on a power-up from cold start scenario. Controlling the order of devices powering on is a very useful ability when turning on a Information Technology infrastructure because to achieve reliable startup, some devices and services need to be started in a particular order to come up reliably. This is accomplished in the Zonit Power System Methodology by allowing the data center operator to associate a particular device with a receptacle or receptacles and then set a device power-on order for all defined devices in a set or set(s). Also, the startup inrush current draw of Electronic Data Processing (EDP) equipment (when power supplies start, fans and disks startup) is usually the highest current draw time. Sequencing the startup of all of the devices connected to a particular circuit helps to insure that the inrush current maximum does not trip the branch circuit breaker.
4. The ability to do intelligent, pre-planned load shedding. A difficult issue that can arise in running a data center during a utility power brownout or outage is how to manage power loads. The backup power facilities (battery and generator) may or may not have sufficient capacity to power the entire data center during the utility outage or if fuel for the emergency generators runs out and the UPS batteries start to run down. In a traditional data center, staff must make quick decisions on what equipment to shut down and in what order. It is easy to make mistakes in these circumstances and cause inadvertent service outages.

The Zonit Power System Methodology allows pre-planned, multi-phased and time delay controlled intelligent shutdown of data center equipment based on whatever criteria the data center manager chooses. This allows the data center and co-location managers to prioritize the uptime of critical services, clients, etc. as needed.

Figure 9:
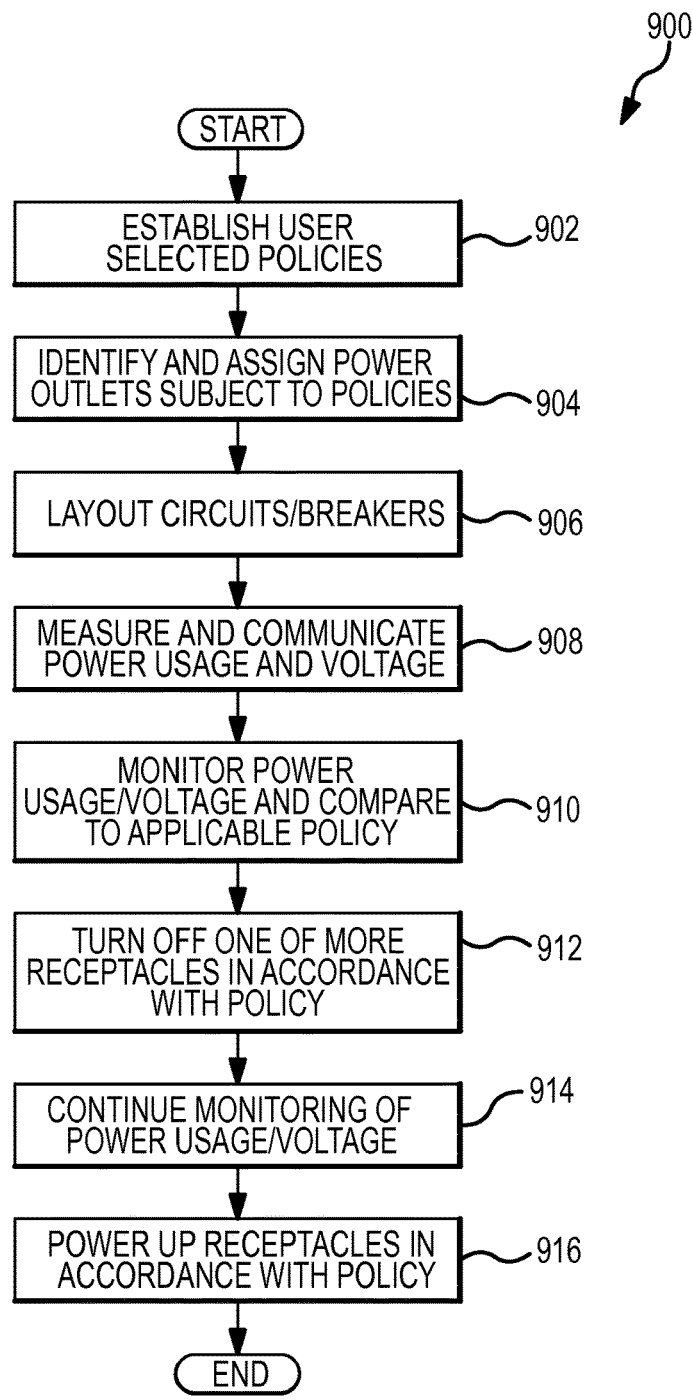
FIG. 9 is a flowchart showing a process for operating a data center according to user policies in accordance with the present invention.

This process 900 can be summarized by reference to the flowchart of FIG. 9. The illustrated process 900 is initiated by establishing (902) user selected policies. These policies may define, for example, a desired priority for powering down (or maintaining power to) pieces of data center equipment and/or a desired sequence for powering up or powering down such equipment. As noted above, policies may also be used to implement a soft circuit breaker. Power outlets subject to such policies are then identified (904). For example, the outlets associated with each piece of equipment may be entered by a user or specific equipment or equipment types may be identified based on a power signature. Virtual Circuits (one or sets of receptacles) and soft circuit breakers (current limits for each Virtual Circuit may then be defined (906) in a manner that allows for enforcement of the policies.

During use, the power usage and voltage associated with individual receptacles, branch circuits or other data center subdivisions can be measured (908) and communicated to a controller responsible for enforcing the policies. The controller can then monitor (910) power usage and voltage and compare those values to an applicable policy. When a policy violation is identified, one or more receptacles may be turned off (912) in accordance with the policy. It will be appreciated that, in certain cases, a policy violation may be addressed in a manner other than by turning off power to the receptacle, e.g., by limiting power to the receptacle or generating an alert.

The controller can then continue (914) monitoring power usage and voltage of the monitored receptacle(s). When the situation that resulted in the policy violation has been alleviated, the receptacle(s) can be powered up (916) in accordance with the policy. For example, the policy may define a priority or sequence for powering up various pieces of equipment associated with various receptacles.

I. Data Center Power Distribution Capacity Upgrade Issues

We are in a time of rapid power capacity growth in data center environments. Current rates of US electrical consumption for data centers have grown from under 1% to being estimated to soon top 3%, a threefold increase. This is driven by a number of factors such as an annual increase factor of 1.2 (which yields a 2× increase every 4 years) in the rate of CPU power consumption and a desire to increase deployment density in the data center to maximize return on investment for the large capital investment a data center requires.

The result of these trends is an increasing number of data centers that do not have enough power delivery capacity to equipment on the floor. Data center managers dread power upgrades because they are very disruptive, requiring hard to negotiate downtime or other painful measures. To upgrade the power distribution in a data center is a difficult task with a lot of issues that must be carefully managed. The power delivery capacity has to be upgraded in two main areas, the core infrastructure (power grid feeds, UPS, generators, battery capacity and Power Distribution Units (PDUs) and the power distribution elements (power whips from the PDU to the racks, either underfloor or overhead). Upgrading the power distribution on the data center floor is the most painful part of the process for several reasons:

1. Space is Tight and "hot" Conduits Cannot be Reused

The layout of the conduits needed to power a data center occurs in a space constrained environment when it is originally built out. To reconfigure a conduit with upgraded power capacity you must power down all conductors in that conduit, which can be difficult if you are trying to minimize downtime. This is required by the National Electrical Code (NEC). If redundant independent uniform A-B power was not part of the original data center design, (true of the majority of older data centers and almost all co-location data centers) then the original power whips usually must be left in place and new conduits run. This is painful and expensive as underfloor or overhead space is hard to come by and new conduits underfloor take up plenum space, decreasing cooling efficiency. Also working in these spaces is difficult and must be done cautiously, so that the existing infrastructure of network cabling (fiber & copper), power whips, cooling lines, etc. is not damaged. This raises labor cost and therefore expense. The optimum way to upgrade a data center is usually zone by zone, each consisting of a set of racks, but to do this, there has to be space available to clear out a zone before it is upgraded, and that requires a set of equipment shutdowns to do.

2. Multiple Shutdowns are Needed, Increasing Enterprise Service Loss Risk

Each rack that is being upgraded has to be shutdown at some point to cut over to the new upgraded power. Each shutdown has to be scheduled and has its own set of risks. The inter-dependencies of modern IT infrastructures and their applications are quite complex and may not be always fully known. A single piece of equipment may provide an underlying service that nobody realized was dependent on that device. When the power cutover occurs the larger business function that depends on that service stops, and this can be very expensive.

Restarting an IT infrastructure and the applications that run on it successfully, from either a cold-start or intermediate state is very site-specific and chancy. Most enterprise sites never test this aspect of their information systems. To do it right, you have to know the sequence and timing of network, system and application service startup and have tested and insured that it works. In any complex enterprise environment, all services do not usually recover normally if you just power everything up at the same time. Problems also can occur if you power down and power up a particular sub-component. Human intervention and manual reboots or service stop/starts are required to get everything working right. Worse, corruption of service configurations or data occasionally happens. The downtime that occurs when having these types of problems can be significant and is difficult to diagnose and fix.

There are three places that a power distribution system can require upgrades, the PDU, the power whips and the equipment rack or in a data center that uses busbars, two places, the busbars and the equipment rack. The traditional methodology requires that all of these areas be upgraded to increase power distribution capacity. The Zonit system methodology is designed to minimize the number of areas that need to be upgraded and make each upgrade process as easy and non-disruptive as possible.

1. PDU Upgrades

PDU's have two basic power constraints, the total amount of power they can distribute and the number of circuit breakers (stations) that they can have installed. The Zonit system enables a much lower number of higher capacity power whips to support a given number of racks. This in turn minimizes the number of PDU stations that are required, which helps prevent the need for PDU upgrades. If equivalent power capacities for the most common type of EDP equipment are compared, the ratio of 30 A (the lowest capacity) three-phase Zonit specification whips to single phase 20 A whips is 4 to 1.

2. Whip Upgrades

The Zonit system is designed to avoid or eliminate power whip upgrades as much as possible. If the client deploys 60 A capacity whips uniformly at build-out, then the Zonit system supports any power need from 20-60 A in three-phase, split-single or single phase, without any power whip changes. If a client deploys a mix of capacities from 30-60 A, with 60 A Zonit spec whip cabling, then only the PDU circuit breakers need to be changed to upgrade the power whip capacity. If the client needs to upgrade a 30 A power whip (with 30 A power whip cabling) it is much easier to deploy a new Zonit pre-fabricated power whip than deploy new power conduits, per the traditional method, because the Zonit whips are prefabricated, flexible and do not require any conduit to be installed.

3. Busbar Upgrades

A busbar system presents special challenges when it is upgraded. Simply put it usually powers so many racks that it is very, very painful to upgrade, since there is no way to power down entire the busbar so that only some of the racks it powers are shut down, as can be done with PDU's and power whips. The best option is to deploy busbars in A-B pairs and upgrade one source at a time. The only other way is to disconnect each device or plugstrip from the busbar and move it to another power source. This makes upgrades very hard since downtime is hard to schedule and the difficulty increases with the number of systems that must be brought down at one time. Using the Zonit Power Distribution System with busbars can ease the situation since each ZPDU can be disconnected on either the A and B side and reconnected to another power source independent of the busbar being upgraded as described below in the Zonit Upgrade Methodology.

4. Rack Upgrades

The usual issue in rack power capacity upgrades is the per receptacle power budget. There are too many power hungry servers plugged into each 20 A circuit.

The Zonit system methodology allows this issue to be easily addressed in several ways.

Upgrade the power input into the ZPDU unit.

The ZPDU unit has a modular input assembly which can be changed as needed. The interior power distribution harness of the unit is rated to the maximum 60 A, so it can accept three-phase wye configured power from 30-60 A. If the ZPDU is upgraded from 30 A input to 60 A inputs, the per receptacle power budget is doubled. The Zonit methodology by being designed to deliver three-phase power at the rack and specialize the power type there, allows this type of upgrade to be done. The ZPDU apparatus was designed to take advantage of this feature of the methodology.

Increase the number of 20 A circuits per rack.

The Zonit "Double-Shot" power strips are designed to replace the Zonit standard size (66") vertical power strips in exactly the same form factor with the same number of receptacles using the same rack mounting brackets. This doubles the per receptacle power budget in the same form factor. Each Double-Shot power strip plugs into a 20 A three-phase L31-20R outlet on the back of the ZPDU. The "Double-Shot" power strips, by plugging in two L21-20P outlets (vs. one L21-20P outlet for the standard strips) deliver twice the power per receptacle. Again, the Zonit power distribution methodology makes this both possible and easy.

The Zonit "Double-Shot" Power Strips can also be provided in a "Single-Shot" variant, which uses the same 2 half-size plug strips that connect together in the same form factor as a single full size vertical 66" plugstrip and use the same mounting brackets. However, the "Single-Shot" variant does not double the power density, the two half size plug strips connect together electrically so that they only have one common input power cord. The advantage of the Single-Shot is that it is easier to install and remove from the rack (like the Double-Shot) because it divides into two half sections. It is easier to put two half-size plugstrip into the rack and then join them rather than try to get a 66" long single plugstrip put in and mounted.

5. Upgrade Rack Power Capacity without any Operational Downtime

The Zonit Upgrade Methodology in accordance with the present invention uses two elements that when combined allow the ZPDU's power capacity to be upgraded in the rack, with minimum disruption. This is combined with an upgrade method based on the Zonit system that allows upgrades to be done with little or no downtime without having to make any other changes to the power whips or PDU (or busbar). Even better, the changes to the deployed elements of the Zonit system minimize the changes to power connections in the rack. The combination of these features makes the Zonit system a very attractive option for data center managers. The elements are the previously described modular A-B power input connector, the second, a design specification of the internal elements of the ZPDU unit (wiring harness and circuit breakers) to support the maximum power capacity the system will deliver. Together this allows the ZPDU to be upgraded to higher power capacity by just changing the modular input cord. No other elements of the Zonit power distribution system (plug strips, Zonit plug adapters or the equipment plugged into them) are affected. The average power available per receptacle is raised, supporting higher power deployment densities. This is a unique feature of the Zonit system, no other rack based power distribution product has this ability.

Power capacity upgrades can be done using the following method with minimal operational impact by utilizing the uniform independent A-B nature of the Zonit power distribution system. Every ZPDU unit is designed to be supplied with identical and independent A-B power. This allows two ways of performing power capacity upgrades in place. All that is necessary for this to happen without downtime, is that the equipment in the racks that are being power upgraded be redundantly connected to the ZPDU that is being upgraded or redundantly connected to two ZPDU units, one on the A power source, the other on the B source. The second option insures redundancy of the ZPDU unit as well as all of the other elements of the power distribution system (power source, power whip, plugstrip or plug adapter. Redundant power connections to equipment in racks is done via one of two methods in the Zonit system.

1. Dual or N+1 Power Supply/Path Devices

This is the normal configuration for enterprise mission critical equipment. It is also the optimum method to deploy the Zonit power distribution system with a pair of A-B power cords connecting each device to the Zonit ZPDU(s) via A-B plug strips or adapters.

2. Single Power Supply/Path Devices

Figure 10:
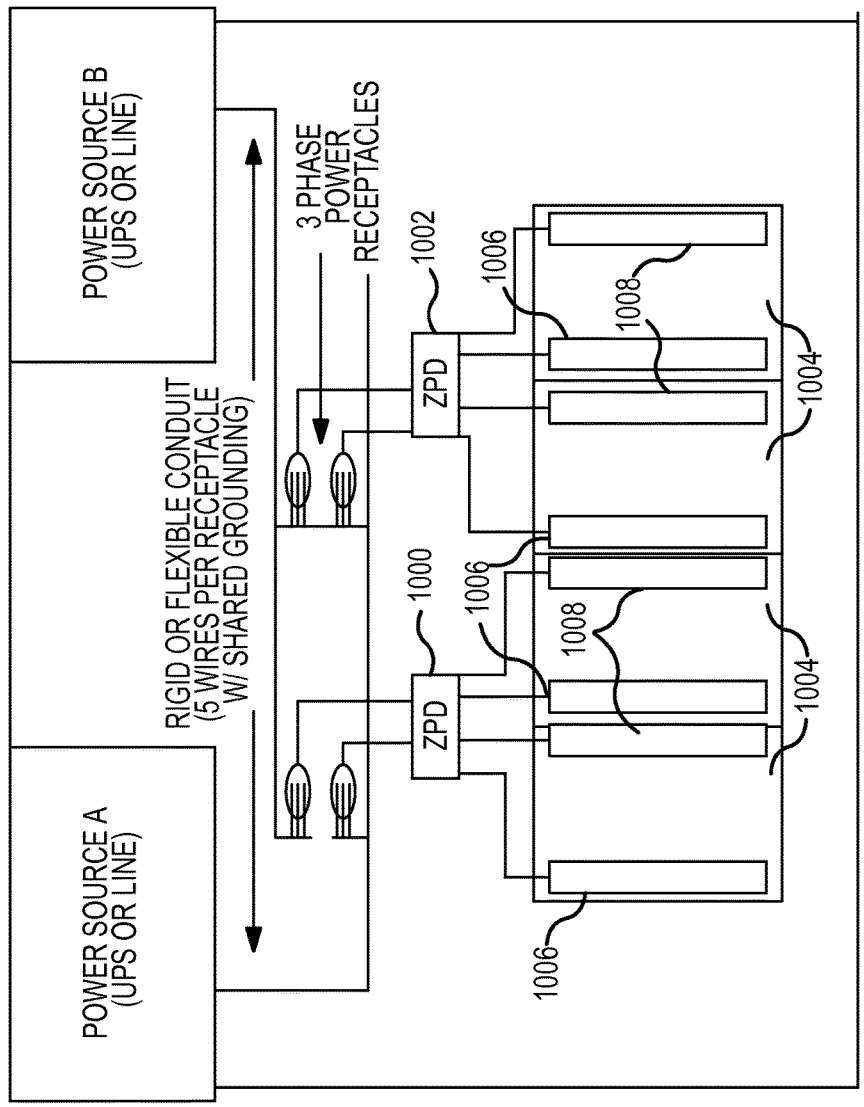
FIGS. 10 and 11 illustrate alternate configurations for providing power from redundant power sources using power distribution units in accordance with the present invention.
Figure 11:
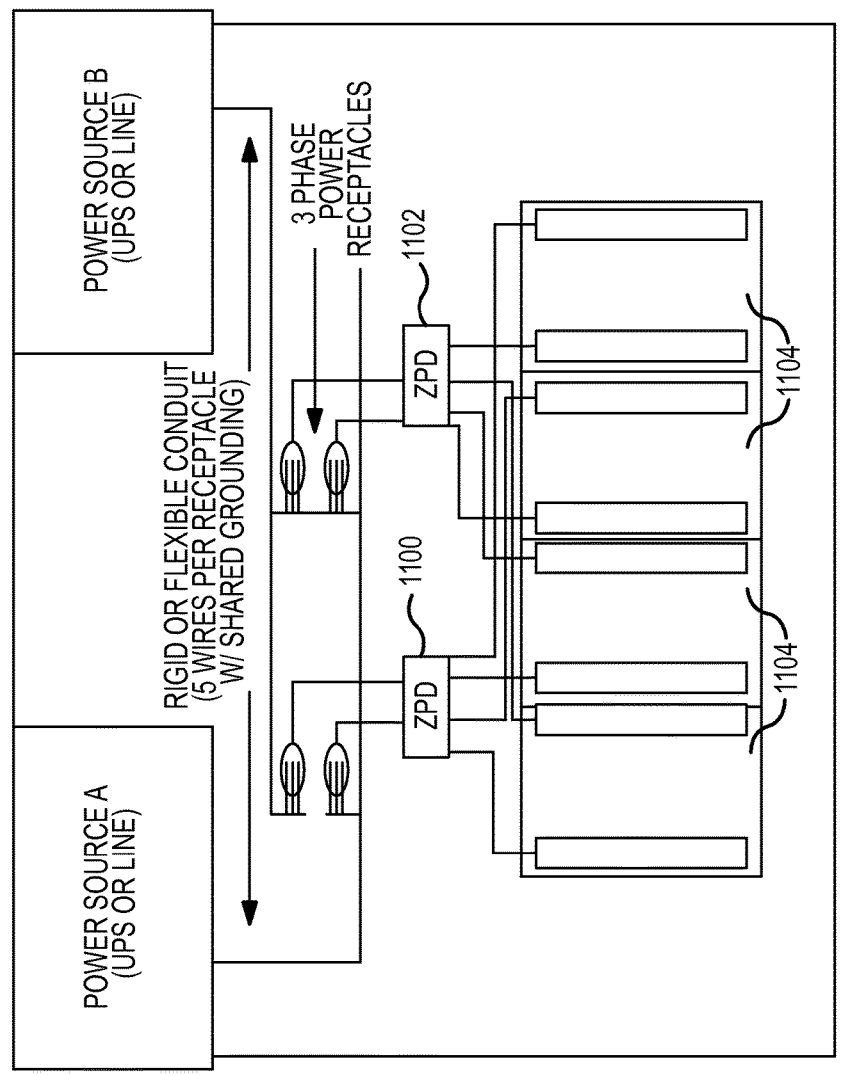

The recommended Zonit deployment configuration for such devices is to use an A-B connected Automatic Transfer Switch (ATS) to insure that the device is always connected to the A-B redundant power sources available from the Zonit ZPDU(s). The ATS is described in PCT Application No. PCT/US2008/057140, which is incorporated herein by reference. Depending on the number of such devices per rack, the ATS can be a 1 U form factor device or a Zonit mini-ATS. Connecting the equipment in the rack redundantly to A-B sources allows one of the two power delivery paths (A or B) to be powered down and disconnected. If only one ZPDU 1000 or 1002 powers the rack(s) 1004 being upgraded (see FIG. 10), the A 1006 (or B 1008) side is disconnected the plug strips and or adapters connected to that ZPDU are moved to a temporary ZPDU or unused outlets on other deployed ZPDU units nearby. Then the other side of the ZPDU being upgraded can be powered down, disconnected and the unit upgraded in the rack by changing the power input cord module and the steps reversed. If the power in the rack 1104 is supplied from two different ZPDU units 1100 and 1102 (See FIG. 11), the ZPDU being upgraded can be powered down and disconnected and no equipment will be left un-powered. Then the procedure is even simpler, power down the ZPDU being upgraded, change the modular input cords, upgrade the power whip and re-power up the unit. Very quick and simple compared to the steps needed to upgrade the power distribution in the standard methodology.

Since the Zonit power distribution system is a modular system that powers 1 to 4 racks, this procedure can be repeated over and over again until the entire data center is power capacity upgraded. It breaks down the project into smaller, more manageable steps, each being essentially identical. The uniform modular nature of the Zonit system, enables such a repeatable process ZPDU by ZPDU unit.

So, to summarize the Zonit system method, the in-place power capacity upgrade is accomplished as follows.

1. The equipment in the racks being upgraded is redundantly connected to A-B power sources fed by either one ZPDU (FIG. 10) or two separate ZPDU units (FIG. 11), using the uniform A-B power delivery capability of the Zonit power distribution system. The first method has one ZPDU unit feeding each zone of racks, the second interleaves power from two ZPDU units to insure that each rack has power from two ZPDU units and neither is a single point of failure. Both methods deliver very high reliability since each ZPDU has independent A-B power inputs and independent A-B power paths within each ZPDU unit.

2. The ZPDU unit being upgraded is powered down and disconnected as described. Zonit makes three phase extension cords that are useful for this purpose.

Note: If maximum reliability during the upgrade is needed both the A and B power sources that are disconnected can be reconnected to temporary A-B alternate sources. The uniform nature of the Zonit system makes it easy to find these sources.

3. The ZPDU unit being upgraded is powered down and disconnected as described. Zonit makes three phase extension cords that are useful for this purpose. If maximum reliability during the upgrade is needed both the A and B power sources that are disconnected can be reconnected to temporary A-B alternate sources. The uniform nature of the Zonit system makes it easy to find these sources.

4. The A-B whip pair that normally feeds the ZPDU being upgraded is now powered down and capacity upgraded. This can be done in one of two ways.
   i. If the whip was originally deployed with sufficient gauge wiring to be upgradable (a Zonit recommended practice) the only changes needed to the whips are to change the circuit breakers in the PDU to a higher capacity and the outlet receptacle in the whip to a higher capacity version.
   ii. If the whip needs to be replaced to deliver higher capacity, then a prefabricated Zonit whip using MC cable can be rolled out, routed, tied down and have a new receptacle installed while the old whip is "hot". If spare PDU slots are available, the new whip can use different PDU breaker slots and be made hot in advance of powering down the old whip. This technique reduces the time needed to do the cutover and therefore makes the risk of running on only one power source (A or B) potentially acceptable if only a very short time window is needed to power down the old whip, disconnect the modular input to the ZPDU and then attach new modular input cords from the new whip and power it and the ZPDU up. This procedure can be done in a matter of minutes (inside the battery reserve time of a UPS) and therefore is very unlikely to cause a power outage due to being on one power source for a short time period. The fewer steps that are needed and the more repeatable they are delivers the most reliable result, which is crucial for data center power upgrades.

5. If busbars are in use to power the ZPDU units, then all of the ZPDU units connected to a single busbar can be moved to alternate power sources as described above. The busbar can then be powered down and upgraded.

Figure 12:
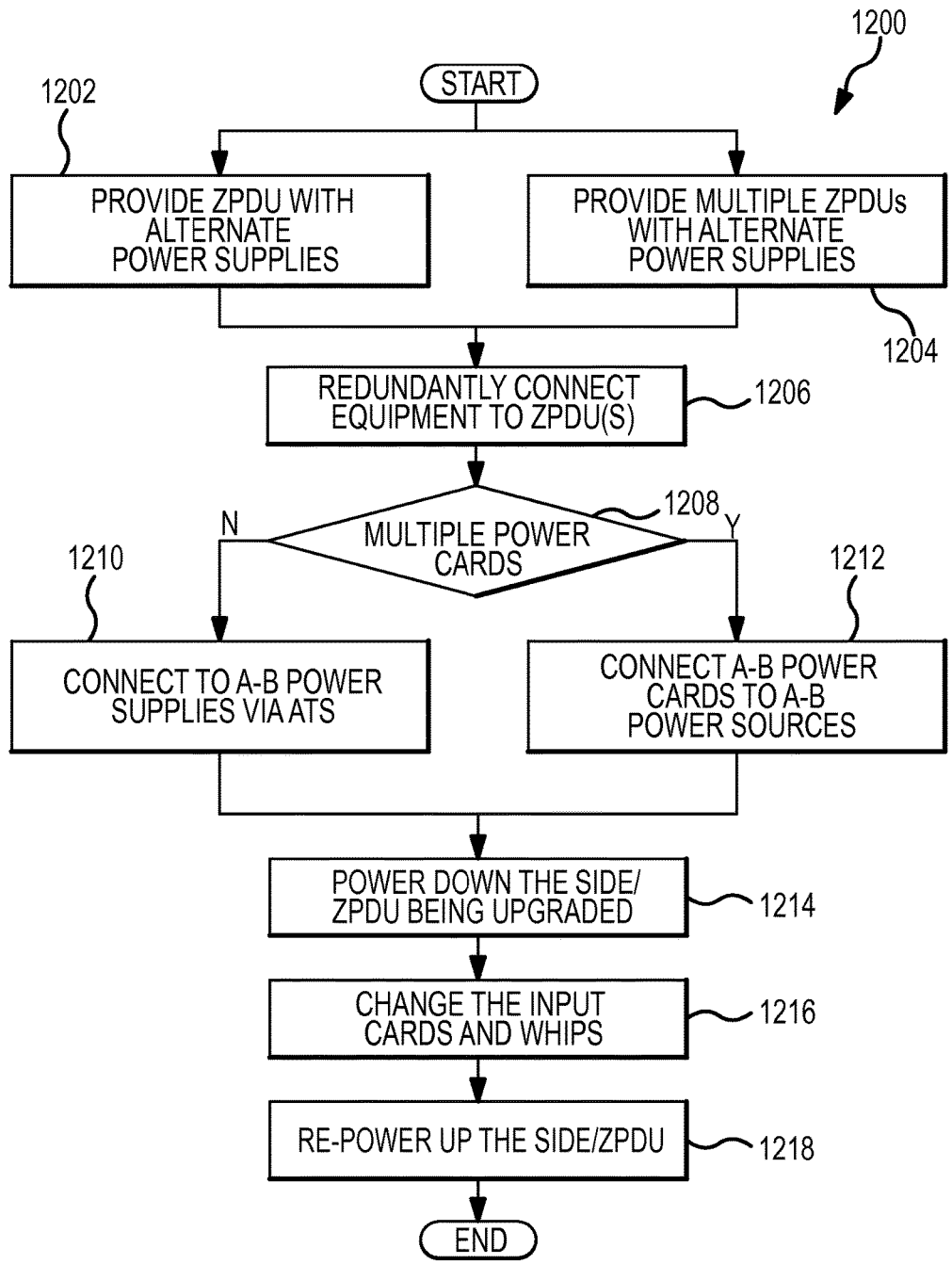
FIG. 12 is a flowchart showing a process for upgrading or changing a power source without interrupting power to data center equipment in accordance with the present invention.

FIG. 12 provides a flowchart of this process. The illustrated process 1200 may involve providing (1202) a single ZPDU with alternate power supplies for powering a piece of equipment or providing (1204) multiple interleaved ZPDUs with alternate power supplies. The equipment is then redundantly connected (1206) to the alternate power supplies via a single or multiple ZPDUs. In this regard, the manner of making this redundant connection depends on whether the equipment includes two power cords (1208). If so, the power cords may be connected (1212) to receptacles associated with different power supplies within a single or multiple power strips. If the equipment includes only a single power cord, the equipment may be connected (1210) to receptacles associated with different sources via an automatic transfer switch as described above.

Where the equipment is thus redundantly connected to multiple power sources, an upgrade can be initiated by powering down (1214) the side of the ZPDU being upgraded. The upgrade can then be executed by, for example, changing (1216) the input cords and whips being upgraded. The side of the ZPDU that has been upgraded can then be repowered (1218).

J. Data Center Power Quality Monitoring and Debugging Issues

Power quality is crucial in a data center or co-location facility. There are many potential problems in data center power distribution that can affect power quality. One is the large scope of the problem. A typical data center has many branch circuits which can number into the thousands. The number of receptacles and connected devices can number into the tens of thousands. These numbers can present significant problems when trying to find and isolate power problems. Traditional power quality measuring instruments are usually limited to 8 channels (4 power, 4 voltage). This limits the number of points in the power distribution topology that can be sampled simultaneously and that can make it very difficult to find certain kinds of power problems such as ground loops that can affect a wide number of branch circuits.

The Zonit Power Distribution Methodology solves these power quality management issues in a unique way. The Zonit system method is to implement power quality monitoring abilities on all Zonit G2 ZPDU units and Zonit G2 intelligent receptacles and/or adapters. The G2 ZPDU units can monitor power and voltage on their A-B branch circuit inputs and each intelligent adapter and all intelligent plugstrip receptacles. These capabilities offer the user an array of standardized, real time sensors that cover the entire data center power distribution system, a unique feature. The advantages of a standardized sensor array embedded in the power distribution system vs. the traditional stand-alone test instrument are many.

1. The standardized sensors are all the same for the same type of sensor location (branch circuit, adapter, plugstrip) and the sensor location, geometry and associated circuitry are the same for each location type. Since they read the current and voltage waveforms with the same hardware and it is uniform, the readings between like types of sensors can be directly compared and all sensor readings can be normalized so that the variables that are really changing are isolated and the true amount of change can be accurately measured. This is especially valuable when trying to isolate electrical problems that can be seen over large parts of the data center, and therefore only vary by a small amount when measured from different locations in the topology of the power distribution system.

Zonit has developed a unique sensor apparatus for measuring power current and voltage levels in an economical, space efficient and standardized way. We do this by use of Wire-wrapped Relays for current sensing w/Form B relays. Each Zonit intelligent receptacle uses Form B relays to control power to the receptacle. Current sensing is a feature that is needed in a variety of applications, such as the Zonit Power Distribution System, for instance. In current practice it is done via a number of ways, Hall effect sensors, current doughnut sensors and other means. Form B relays are a type that require energization of the relay to open the circuit that they are controlling the current path of. The method we have invented for this need is novel in that we take an existing relay, with an electromagnetic core, and wrap a conductor (once or as many turns as are needed by the application) around the core (either around the existing external packaging of the assembly or around a guide or other directing mechanism as needed) which provides a current loop sensor. The accuracy of the loop is either sufficient without calibration or if not, calibration is obtained by applying a known load to the assembly during manufacturing or during an auto-calibration routine during startup. This standardizes the current loop sensor. The advantages of this method vs. traditional techniques are as follows:
    a. Lower cost.
       This method eliminates the traditional need for pre-calibrated current measuring devices to be used.
    b. Flexibility of implementation.
       Physical routing of the wire loop(s) can be varied as needed to maximize accuracy and/or space availability to meet the needs of the application.
    c. Can sense current when relay is not energized, e.g., circuit is closed and current path through the relay contacts is active.
    d. Requires very little additional space in the plugstrip, which in turn helps to minimize the dimensions of the plugstrip.

Basically, the method leverages the nature of the Form B relay because that form only uses the electromagnetic core when the controlled circuit is being held open and no current is flowing. When the relay is not energized the circuit is closed and the core can be used to sense the current in conjunction w/the integrated conductor loop(s).

The traditional way of measuring power quality requires that multiple measurements be taken wherever the instrument can be inserted into the power distribution system which can require equipment shutdowns to place the sensor in-line) or wherever inductive sensors can be placed, which can vary and therefore introduce a variable which can be hard to compensate for in the measurements taken. The Zonit system power quality measuring methods eliminate these problems.

2. Problems that are time variable and transient are very hard to isolate with traditional test equipment, since the equipment must be running and monitoring the right locations in the power distribution topology to detect the problem. The Zonit system monitoring methodology easily finds such problems because it can monitor the entire power distribution topology continuously and compare reference or historical data sets to current data sets.

This offers four types of power monitoring that are unique in data center power distribution systems.

1. Real-time power quality monitoring simultaneously for a large set of selected points (branch circuit(s), receptacle(s), adapter(s)) in the power distribution topology. Each ZPDU can monitor both of its A-B source branch circuits, and all connected Zonit G2 intelligent receptacles and/or intelligent adapters.
2. Post analysis of the data set. This is done at the Zonit Power Management Station, which receives the data for the chosen monitoring points and then performs analysis on the data set. The data set can be stored for later further analysis or comparative analysis.
3. Comparative analysis of the data set vs. reference values or previously stored data sets.
4. Analysis of any or all powered devices to watch for power supply problems and predict failures.

The Zonit system power quality monitoring abilities adds an additional feature in the area of receptacle availability and inventory. The power quality monitoring hardware can be used to inject a suitable low level signal into any power outlets or receptacles that are currently not drawing any measurable power. This signal will travel up any attached power cord over a minimum length (about 2 inches) and then reflect back to the receptacle when it reaches the end of the power cord. This reflection can be sensed, which determines that the receptacle or outlet has a power cord plugged into it. This capability can be used to keep a real time inventory of the number of actual available (vs. occupied but not active) receptacles in the Zonit power distribution system. This is useful information for remote data center operators and data center managers. An alternative method is to install an optical sensor that senses if the receptacle is occupied. Another method is to place an appropriate located microswitch to detect when the receptacle is occupied. All of these methods can be used to implement this functionality.

Figure 13:
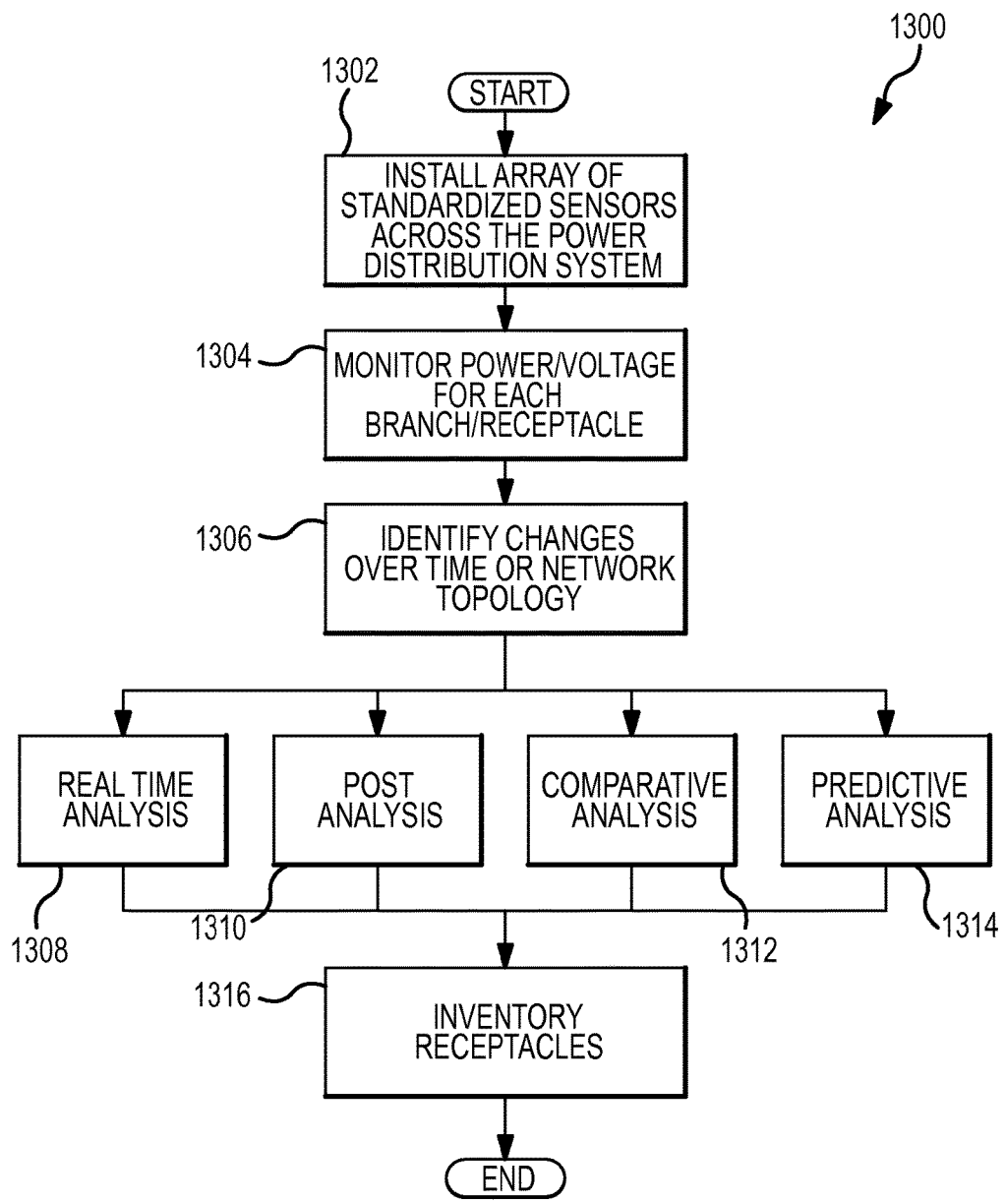
FIG. 13 is a flowchart showing a process for monitoring data center equipment in accordance with the present invention.

FIG. 13 provides a flowchart of this process. The illustrated process 1300 is initiated by installing (1302) an array of standardized sensors across the power distribution system. The outputs from the sensors can then be used to monitor (1314) the power and voltage for each monitored branch or receptacle of the data center. A monitoring controller can then identify (1306) changes over time or network topology. This monitoring can be used for real time analysis (1308) post-analysis (1310) based on accumulated data, comparative analysis (1312) based on comparisons of values over time or different areas of the data center topology, and/or predictive analysis (1314) to identify potential malfunctions or errors. This process can also be used to inventory (1316) receptacles to identify which receptacles are and are not in use, as described above.

K. Data Center Environment Monitoring and Management Issues

The data center manager is usually responsible for power, cooling, fire suppression and physical security in the data center. This is referenced to herein as the data center environment. Other Information Technology (IT) groups usually monitor and run the higher level functions such as network connectivity, servers, storage, databases, applications, etc. that use the EDP equipment located in the data center.

The data center manager does not only want to know what is going on in the data center environment as a whole, he wants to subdivide the status into sets of racks or individual racks (especially in a co-location facility) and he wants to group the information into meta-groups that represent information he needs, such as all of the racks occupied by a particular client or group, all racks with storage devices, etc.

Existing data center environment monitoring products suffer from the problem that they do not have known, uniform topologies for how they distribute their environmental and security sensors and therefore each sensor must be manually addressed if the monitoring product is to build a picture of what is happening at any sub-level of the data center, such as the rack or technical political subdivision. This is clumsy and requires more work by the data center staff. Also, it is inflexible, as sensors must in essence be readdressed if they move.

The Zonit Power Distribution Methodology solves these data center environmental monitoring and management issues in a unique way. The Zonit system method is to use the known topology associations of the Zonit power distribution system (each ZPDU powers a given set of racks) and the power quality monitoring features (a power fingerprint can be developed to identify a particular piece of equipment) to associate sensors with racks and equipment with receptacles and/or adapters. In the Zonit system, provisions are made to connect sensors to ZPDU units. This associates sensors to a set of racks, and if the connections are made on a per plugstrip or adapter basis to a particular rack. Once the data center staff identify the rack location of any piece of equipment plugged into a particular receptacle to the Zonit power monitoring station database, the Zonit system can automatically label every receptacle on that plugstrip as being in that rack and every sensor plugged into that plugstrip as being in that rack. This methodology can be used in the same way for a set of racks which are powered by a ZPDU (in the interleave method, racks are associated with whichever ZPDU provides the A side power), to associate all of the sensors that plug into that ZPDU with that set of racks.

A unique capability for tracking equipment moves and automatically updating the equipment database also exists using the Zonit system methodology and capabilities. If a piece of equipment is to be moved within the data center it is marked for movement. A power "fingerprint" is taken of the equipment, which can conveniently done via the Zonit Web interface. The equipment is then shutdown, moved and re-powered. The Zonit system will detect the equipment, and then request confirmation of the move via the Web interface. At that point the Zonit power management station database will be updated to reflect the move and all associations in the database for that piece of equipment will be transferred as part the move.

Figure 14:
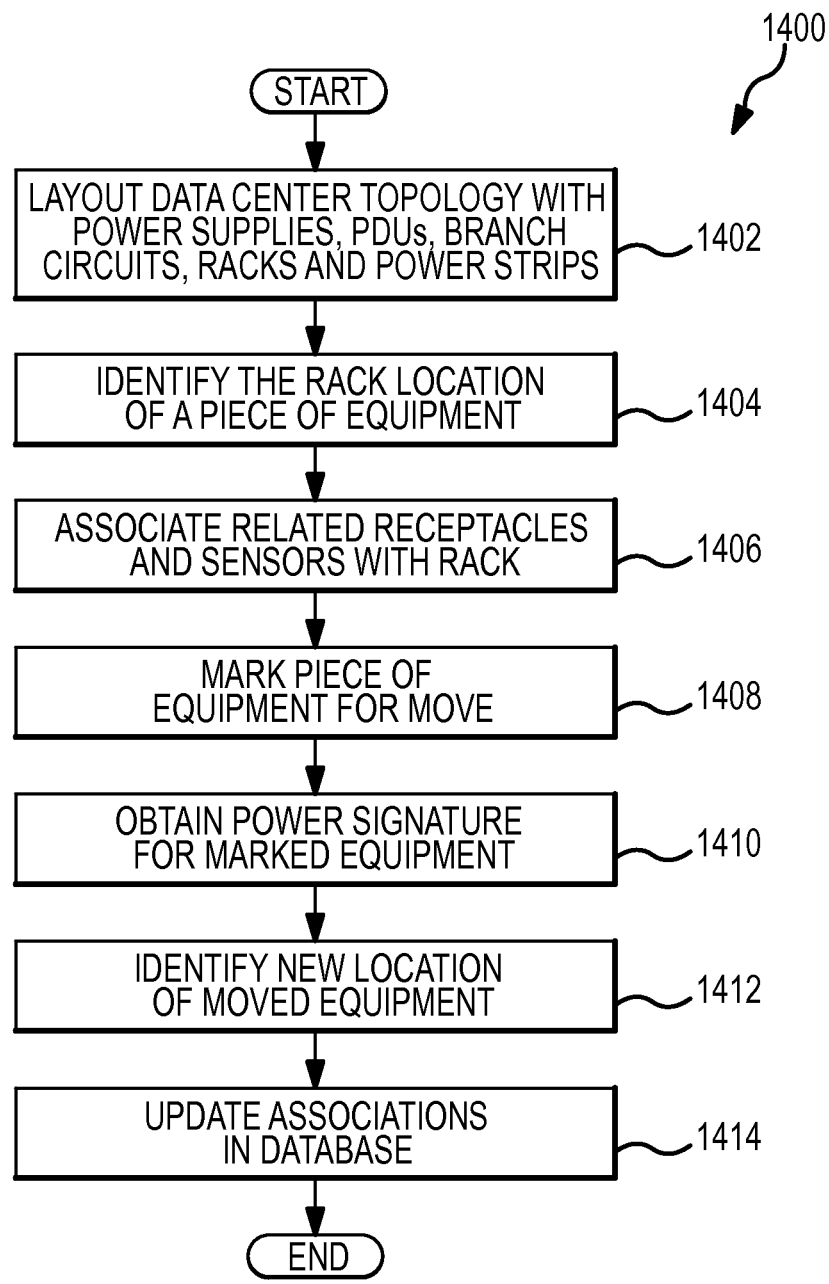
FIG. 14 is a flow chart illustrating a process for tracking equipment locations in a data center in accordance with the present invention.

FIG. 14 provides a flow chart of this process. The illustrated process 1400 is initiated by laying out (1402) the data center topology with power supplies, PDUs, branch circuits, racks and power strips. The rack location of a piece of equipment can then be identified (1404). In this regard, the locations of pieces of equipment may be entered by a user or the locations may be determined by recognizing the power fingerprint of a piece of equipment or type of equipment. Once a piece of equipment has been located, related receptacles and sensors may be associated (1406) with the same rack.

When it is desired or necessary to move a piece of equipment, that piece of equipment may be marked (1408) for the move. A power signature may then be obtained (1410) for the marked equipment. After the piece of equipment has been moved, the new location may be identified (1412) by recognizing a receptacle associated with the power signature. The equipment associations in a database can then be updated (1414) based on the identified new location of the equipment.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed:

1. A method for use in distributing power, comprising the steps of:
   establishing a group policy for controlling delivery of power to a group of two or more electrical devices via a set of two or more plug receptacles, wherein a first device of said two or more electrical devices is located at a first plug receptacle of said set of two or more plug receptacles;
   identifying each of said two or more electrical devices as being part of said group independent of which said set of two or more plug receptacles are used by said two or more electrical devices, wherein said identifying comprises associating said first plug receptacle from said set of two or more plug receptacles with said first device of said two or more electrical devices, said associating determined free from any user input;
   first identifying an occurrence of a policy condition governed by said group policy, wherein in response to said first identifying, delivery of power to said first device is controlled via first applying said group policy to said first plug receptacle;
   moving at least said first device to a new location, wherein said first device is located at a second plug receptacle;
   identifying said first device as being part of said group, wherein said identifying comprises associating said second plug receptacle with said first device, said associating determined free from any user input;
   second identifying an occurrence of a policy condition governed by said group policy, wherein in response to said second identifying, delivery of power to said first electrical device is controlled via second applying said group policy to said second plug receptacle;
   wherein each of said first and second applying comprises operating a switch system to control delivery of power to at least said first electrical device of said two or more electrical devices.

2. The method as set forth in claim 1, wherein said switch system comprises a number of virtual circuit breaker devices each independently operable to interrupt power to one or more of said two or more electrical devices.

3. The method as set forth in claim 1, wherein said step of operating comprises executing a sequence for one of turning on and turning off power to said set of two or more plug receptacles.

4. The method as set forth in claim 1, further comprising the step of developing a power fingerprint to identify said first electrical device.

5. The method as set forth in claim 1, wherein said two or more electrical devices comprise multiple electrical devices, and said set of two or more plug receptacles comprises multiple plug receptacles, said method comprising the steps of:
   establishing a policy for controlling delivery of power to said multiple electrical devices via said multiple plug receptacles;
   operating a switch system to control delivery of power to said multiple electrical devices via said multiple plug receptacles;
   limiting power to less than full power but more than no power via one or more plug receptacles;
   delivering no power via one or more plug receptacles; and
   delivering full power via one or more plug receptacles.

6. The method as set forth in claim 1, further comprising the steps of:
   establishing a policy for controlling delivery of power to said two or more electrical devices via said multiple plug receptacles; and
   monitoring said two or more plug receptacles on a per receptacle basis.

7. The method as set forth in claim 1, comprising the steps of:
   developing a power fingerprint to identify said first electrical device; and
   tracking said moving of the first electrical device from the first plug receptacle to the second plug receptacle based on the power fingerprint.

8. The method as set forth in claim 7, comprising the steps of:
   providing a power management station database for tracking a location of the first electrical device; and
   updating said power management station database to reflect the moving.

9. The method as set forth in claim 1, wherein upon associating said first device with said second plug receptacle, said group policy is no longer applied to said first plug receptacle.

10. A system for use in distributing power, comprising:
    a central management appliance having a user interface and a controller;
    a power distribution unit in communication with said central management appliance; and
    a plug strip having a switch system and a plurality of plug receptacles, said plug strip in communication with said power distribution unit;
    wherein said central management appliance is configured to establish a group policy for controlling delivery of power to a group of two or more electrical devices via two or more of said plurality of plug receptacles, identify each of said two or more electrical devices as being part of said group independent of which receptacles of said plurality of plug receptacles are used by said two or more electrical devices, associate a first plug receptacle of said plurality of plug receptacles with a first device of said two or more electrical devices free from any user input, identify a first occurrence of a policy condition governed by said group policy, wherein based on said identifying said first occurrence, said controller operates said switch system to control delivery of power to a first electrical device of said two or more electrical devices via said first plug receptacle of said plurality of plug receptacles; and
    wherein said central management appliance is configured to identify a move of said first device from said first plug receptacle to a second plug receptacle, associate said second plug receptacle with said first device of said two or more devices free from any user input, identify a second occurrence of said policy condition governed by said group policy, wherein based on said second occurrence, said controller operates said switch system to control delivery of power to said first electrical device via said second plug receptacle.

11. The system as set forth in claim 10, wherein said switch system comprises a number of virtual circuit breaker devices each independently operable to interrupt power to one or more of said two or more electrical devices.

12. The system as set forth in claim 10, wherein said central management appliance is configured operate said switch system to execute a sequence for one of turning on and turning off power delivered via said plurality of plug receptacles.

13. The system as set forth in claim 10, wherein:
said central management appliance is configured to develop a power fingerprint to identify a particular electrical device, and apply said policy for controlling delivery of power to said particular device via one or more of said plurality of plug receptacles.

14. The system as set forth in claim 10, wherein said two or more electrical devices comprise multiple electrical devices and said central management appliance is configured to:
    establish a policy for controlling delivery of power to said multiple electrical devices via said plurality of plug receptacles;
    operate said switch system to control delivery of power to said multiple devices via said plurality of plug receptacles;
    limit power to less than full power but more than no power via one or more of said plurality of plug receptacles;
    deliver no power via one or more of said plurality of plug receptacles; and
    deliver full power via one or more of said plurality of plug receptacles.

15. The system as set forth in claim 10, wherein said central management appliance is configured to:
    establish a policy for controlling delivery of power to said two or more electrical devices via said plurality of plug receptacles; and
    monitor said two or more plug receptacles on a per receptacle basis.

16. The system as set forth in claim 10, wherein said central management appliance is configured to:
    develop a power fingerprint to identify said first electrical device; and
    track a move of the first electrical device from said first plug receptacle to said second plug receptacle based on said power fingerprint.

17. The system as set forth in claim 16, comprising:
    a power management station database for tracking a location of the first electrical device, wherein said central management appliance is configured to update said power management station database to reflect the move.

18. The system as set forth in claim 10, wherein said second plug receptacle is located in a second plug strip having a second switch system and a second plurality of plug receptacles, and said second plug strip is in communication with said power distribution unit.

* * * * *